(12) United States Patent
Back et al.

(10) Patent No.: US 7,628,485 B2
(45) Date of Patent: *Dec. 8, 2009

(54) CONTACT LENS HAVING A UNIFORM HORIZONTAL THICKNESS PROFILE

(75) Inventors: Arthur Back, Danville, CA (US); Gregg A. Dean, Southampton (GB)

(73) Assignee: Coopervision International Holding Company, LP, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 11/609,852

(22) Filed: Dec. 12, 2006

(65) Prior Publication Data

US 2007/0109495 A1 May 17, 2007

Related U.S. Application Data

(63) Continuation-in-part of application No. 11/188,071, filed on Jul. 22, 2005, now abandoned, which is a continuation of application No. 10/827,168, filed on Apr. 19, 2004, now Pat. No. 6,971,746, which is a continuation of application No. 10/171,718, filed on Jun. 14, 2002, now Pat. No. 6,857,740, which is a continuation of application No. 09/818,244, filed on Mar. 27, 2001, now Pat. No. 6,467,903, and a continuation-in-part of application No. 11/127,584, filed on May 11, 2005, now abandoned, which is a continuation of application No. 10/171,927, filed on Jun. 14, 2002, now Pat. No. 6,923,538, which is a continuation of application No. 09/611,768, filed on Jul. 6, 2000, now Pat. No. 6,431,706.

(60) Provisional application No. 60/193,493, filed on Mar. 31, 2000.

(51) Int. Cl.
*G02C 7/04* (2006.01)

(52) U.S. Cl. .............................. 351/160 H; 351/160 R

(58) Field of Classification Search ............. 351/160 H, 351/160 R, 161, 162, 177
See application file for complete search history.

(56) References Cited

U.S. PATENT DOCUMENTS 2,544,246 A   3/1951  Butterfield (Continued)

FOREIGN PATENT DOCUMENTS

CA   2096706   11/1994

(Continued)

OTHER PUBLICATIONS

Edwards, Optician, No. 5695, vol. 217, Apr. 2, 1999, p. 18-27.

(Continued)

*Primary Examiner*—Scott J Sugarman
(74) *Attorney, Agent, or Firm*—Stout, Uxa, Buyan & Mullins, LLP; Frank J. Uxa; Greg S. Hollrigel

(57) ABSTRACT

A contact lens having a rotational stabilization mechanism thereon, such as prism ballast, and a thickness profile that reduces the torque imparted on the lens by the action of the eyelids, especially for stabilizing toric lenses. The prism ballast is provided on one or more portions of the anterior face of the lens such that the lens body has a uniform thickness of within 10% along horizontal cross-sections. The anterior face of the lens may be segregated into a peripheral zone, an inner zone circumscribed by the peripheral zone, and a central optic zone. The prism ballast portion is provided within the inner zone, which may be further subdivided into a superior portion, an intermediate portion proximate the optic zone, and an inferior portion. The ballast portion increases in thickness along a superior-inferior line parallel to a vertical meridian, and has a substantially uniform thickness perpendicular thereto. The peripheral zone may be tapered, and have a rounded edge. The rate of thickness change across any portion of the peripheral zone is less than about 250 μm/mm.

29 Claims, 9 Drawing Sheets

U.S. PATENT DOCUMENTS

| | | |
|---|---|---|
| 3,700,761 A | 10/1972 | O'Driscoll et al. |
| 3,761,208 A | 9/1973 | Boudet et al. ................ 425/352 |
| 4,036,814 A | 7/1977 | Howes et al. |
| 4,084,890 A | 4/1978 | Baron |
| 4,095,878 A | 6/1978 | Fanti |
| 4,121,896 A | 10/1978 | Shepherd .................... 425/412 |
| 4,126,138 A | 11/1978 | Isen |
| 4,138,086 A | 2/1979 | Mizutani et al. ............. 249/116 |
| 4,165,158 A | 8/1979 | Travnicek ............... 351/160 H |
| 4,169,119 A | 9/1979 | Covington |
| 4,198,132 A | 4/1980 | Seger et al. ............. 351/160 R |
| 4,208,364 A | 6/1980 | Shepherd ....................... 264/1 |
| 4,209,289 A | 6/1980 | Newcomb et al. ........... 425/410 |
| 4,211,384 A | 7/1980 | Bourset et al. .............. 249/160 |
| 4,245,069 A | 1/1981 | Covington .................. 525/479 |
| 4,254,065 A | 3/1981 | Ratkowski |
| 4,256,369 A | 3/1981 | Wichterle ............... 350/160 H |
| 4,284,399 A | 8/1981 | Newcomb et al. ........... 425/410 |
| 4,285,890 A | 8/1981 | Mizutani et al. ............. 264/1.1 |
| 4,294,974 A | 10/1981 | LeBoeuf |
| 4,302,081 A | 11/1981 | Tsuetaki ..................... 351/161 |
| 4,310,225 A | 1/1982 | Davis |
| 4,324,461 A | 4/1982 | Salvatori ................ 351/160 H |
| 4,406,189 A | 9/1983 | Neefe |
| 4,418,991 A | 12/1983 | Breger |
| 4,423,195 A | 12/1983 | Covington .................. 525/479 |
| 4,508,436 A | 4/1985 | Sitterle |
| 4,519,681 A | 5/1985 | Wichterle |
| 4,525,043 A | 6/1985 | Bronstein |
| 4,555,372 A | 11/1985 | Kunzler et al. |
| 4,573,774 A | 3/1986 | Sitterle |
| 4,573,775 A | 3/1986 | Bayshore |
| 4,578,230 A | 3/1986 | Neefe |
| 4,580,882 A | 4/1986 | Nuchman et al. |
| 4,605,524 A | 8/1986 | Danker |
| 4,614,413 A | 9/1986 | Obssuth |
| 4,618,227 A | 10/1986 | Bayshore |
| 4,618,228 A | 10/1986 | Baron et al. ................. 351/161 |
| 4,618,229 A | 10/1986 | Jacobstein et al. |
| 4,640,594 A | 2/1987 | Berger |
| 4,642,439 A | 2/1987 | Miller et al. |
| 4,680,998 A | 7/1987 | Council, Jr. |
| 4,681,295 A | 7/1987 | Haardt et al. |
| 4,696,974 A | 9/1987 | Sulc et al. ....................... 525/92 |
| 4,702,573 A | 10/1987 | Morstad |
| 4,761,069 A | 8/1988 | Truong et al. |
| 4,787,732 A | 11/1988 | Siviglia .................. 351/160 R |
| 4,806,287 A | 2/1989 | Sulc et al. |
| 4,820,038 A | 4/1989 | Seger et al. |
| 4,840,754 A | 6/1989 | Brown et al. ................. 264/2.2 |
| 4,850,689 A | 7/1989 | Martin et al. ................. 351/161 |
| 4,854,089 A | 8/1989 | Morales ..................... 51/284 R |
| 4,859,049 A | 8/1989 | Muller |
| 4,874,234 A | 10/1989 | Wichterie |
| 4,955,580 A | 9/1990 | Seden et al. ................... 249/82 |
| 5,020,898 A | 6/1991 | Townsley |
| 5,036,971 A | 8/1991 | Seden et al. ................... 206/5.1 |
| 5,071,244 A | 12/1991 | Ross |
| 5,076,683 A | 12/1991 | Glick |
| 5,087,015 A | 2/1992 | Galley |
| 5,100,225 A | 3/1992 | Rothe |
| 5,125,728 A | 6/1992 | Newman et al. |
| 5,141,678 A | 8/1992 | Blum |
| 5,191,365 A | 3/1993 | Stoyan |
| 5,200,121 A | 4/1993 | Hagmann et al. |
| 5,238,388 A | 8/1993 | Tsai ........................... 425/412 |
| 5,245,366 A | 9/1993 | Svochak .................... 351/161 |
| 5,252,056 A | 10/1993 | Hörner et al. ............... 425/555 |
| 5,258,490 A | 11/1993 | Chang |
| 5,271,875 A | 12/1993 | Appleton et al. .............. 264/2.3 |
| 5,341,604 A | 8/1994 | Wood |
| 5,404,183 A | 4/1995 | Seidner |
| 5,430,504 A | 7/1995 | Muckenhirn et al. |
| 5,456,864 A | 10/1995 | Wickes et al. |
| 5,466,147 A | 11/1995 | Appleton et al. ............. 425/412 |
| 5,493,350 A | 2/1996 | Seidner |
| 5,499,064 A | 3/1996 | Vansaghi |
| 5,500,695 A | 3/1996 | Newman |
| 5,526,071 A | 6/1996 | Seidner et al. |
| 5,532,768 A | 7/1996 | Onogi et al. |
| 5,540,410 A | 7/1996 | Lust et al. |
| 5,601,759 A | 2/1997 | Apollonio |
| 5,606,378 A | 2/1997 | Van Meurs .................. 351/161 |
| 5,608,471 A | 3/1997 | Miller |
| 5,611,970 A | 3/1997 | Apollonio et al. ............. 264/2.5 |
| 5,619,289 A | 4/1997 | Seidner et al. |
| 5,635,998 A | 6/1997 | Baugh |
| 5,650,837 A | 7/1997 | Roffman et al. |
| 5,652,638 A | 7/1997 | Roffman et al. |
| 5,691,797 A | 11/1997 | Seidner et al. |
| 5,757,458 A | 5/1998 | Miller et al. ................. 351/162 |
| 5,760,100 A | 6/1998 | Nicolson et al. |
| 5,760,870 A | 6/1998 | Payor et al. |
| 5,776,999 A | 7/1998 | Nicolson et al. |
| 5,789,461 A | 8/1998 | Nicolson et al. |
| 5,849,811 A | 12/1998 | Nicolson et al. |
| 5,861,114 A | 1/1999 | Roffman et al. |
| 5,894,002 A | 4/1999 | Boneberger et al. |
| 5,916,494 A | 6/1999 | Widman et al. |
| 5,951,934 A | 9/1999 | Wickes et al. |
| 5,971,542 A | 10/1999 | Volker et al. |
| 5,988,813 A | 11/1999 | Neadle et al. |
| 6,089,711 A | 7/2000 | Blankenbecler et al. |
| 6,092,899 A | 7/2000 | Wanders |
| 6,109,749 A | 8/2000 | Bernstein |
| 6,113,236 A | 9/2000 | Chapman |
| 6,135,594 A | 10/2000 | Windey et al. |
| 6,158,861 A | 12/2000 | Oyama et al. |
| 6,176,578 B1 | 1/2001 | Clutterbuck et al. |
| 6,183,082 B1 | 2/2001 | Clutterbuck |
| 6,206,520 B1 | 3/2001 | Jubin et al. |
| 6,234,629 B1 | 5/2001 | Neadle et al. |
| 6,257,547 B1 | 7/2001 | Togo et al. |
| 6,270,218 B1 | 8/2001 | Clutterbuck |
| 6,325,509 B1 | 12/2001 | Hodur et al. |
| 6,364,483 B1 | 4/2002 | Grossinger et al. |
| 6,383,419 B1 | 5/2002 | Dean |
| 6,406,145 B1 | 6/2002 | Jubin |
| 6,431,706 B1 | 8/2002 | Dean |
| 6,444,145 B1 | 9/2002 | Clutterbuck ................ 264/1.1 |
| 6,454,409 B1 | 9/2002 | Lorenz et al. |
| 6,457,826 B1 | 10/2002 | Lett |
| 6,467,903 B1 * | 10/2002 | Back ...................... 351/160 H |
| 6,474,814 B1 | 11/2002 | Griffin |
| 6,475,410 B1 | 11/2002 | Nakagawa ................... 264/2.5 |
| 6,491,392 B2 | 12/2002 | Roffman et al. |
| 6,568,990 B2 | 5/2003 | Siders et al. |
| 6,595,639 B1 | 7/2003 | Ho et al. |
| 6,626,534 B1 | 9/2003 | DiMartino ............... 351/160 H |
| 6,800,225 B1 | 10/2004 | Hagmann et al. ......... 264/1.36 |
| 6,857,740 B2 * | 2/2005 | Back ...................... 351/160 H |
| 6,923,538 B2 | 8/2005 | Dean |
| 6,971,746 B2 * | 12/2005 | Back ...................... 351/160 H |
| 7,133,174 B2 | 11/2006 | Back |
| 7,134,753 B2 | 11/2006 | Back |
| 2002/0021410 A1 | 2/2002 | Ye et al. |
| 2002/0024631 A1 | 2/2002 | Roffman et al. |
| 2002/0071094 A1 | 6/2002 | Roffman et al. |
| 2002/0159025 A1 | 10/2002 | Legerton et al. |
| 2002/0186345 A1 | 12/2002 | Duppstadt |
| 2003/0016331 A1 | 1/2003 | Mandell |
| 2003/0081171 A1 | 5/2003 | Griffin |
| 2004/0156013 A1 | 8/2004 | Lindacher et al. |
| 2004/0207807 A1 | 10/2004 | Lindacher |

| | | |
|---|---|---|
| 2004/0257526 A1 | 12/2004 | Lindacher |
| 2005/0041202 A1 | 2/2005 | Jubin et al. |
| 2005/0068489 A1 | 3/2005 | Hall et al. |

FOREIGN PATENT DOCUMENTS

| | | |
|---|---|---|
| CA | 1333757 | 1/1995 |
| EP | 0 383 425 | 8/1990 |
| EP | 0 440 107 | 8/1991 |
| EP | 0 566 170 | 10/1993 |
| EP | 0 614 105 | 9/1994 |
| EP | 0 741 313 | 11/1996 |
| EP | 0 745 876 | 12/1996 |
| EP | 0 940 693 | 9/1999 |
| EP | 0 942 311 | 9/1999 |
| EP | 0 980 015 | 2/2000 |
| EP | 1 008 890 | 6/2000 |
| EP | 1 014 156 | 6/2000 |
| FR | 2 582 416 | 11/1986 |
| GB | 1463107 | 2/1977 |
| GB | 2 041 557 | 9/1980 |
| JP | 63-3910 | 1/1988 |
| JP | 01187527 | 7/1989 |
| JP | 9-61757 | 3/1997 |
| JP | 11052304 | 2/1999 |
| JP | 2000-214417 | 8/2000 |
| WO | WO 84/04401 | 11/1984 |
| WO | WO 91/04288 | 4/1991 |
| WO | WO 92/22845 | 12/1992 |
| WO | WO 94/23327 | 10/1994 |
| WO | WO 96/08745 | 3/1996 |
| WO | WO 98/45749 | 10/1998 |
| WO | WO 98/45750 | 10/1998 |
| WO | WO 99/00241 | 1/1999 |
| WO | WO 99/23527 | 5/1999 |
| WO | WO 99/36803 | 7/1999 |
| WO | WO 00/48036 | 8/2000 |
| WO | WO 01/16641 | 3/2001 |
| WO | WO 01/17756 | 3/2001 |
| WO | WO 01/29608 | 4/2001 |
| WO | WO 01/42001 | 6/2001 |
| WO | WO 01/44860 | 6/2001 |
| WO | WO 2004/015480 | 2/2004 |
| WO | WO 2004/068214 | 8/2004 |
| WO | WO 2005/019907 | 3/2005 |

OTHER PUBLICATIONS

USPTO Office Action dated Mar. 27, 2003, U.S. Appl. No. 10/171,718, filed Jun. 14, 2002, now U.S. Patent 6,857,740.
USPTO Office Action dated Sep. 23, 2003, U.S. Appl. No. 10/171,718, filed Jun. 14, 2002, now U.S. Patent 6,857,740.
USPTO Office Action dated Dec. 2, 2004, U.S. Appl. No. 10/827,168, filed Apr. 19, 2004, now U.S. Patent 6,971,746.
Office Action dated Feb. 8, 2006 in U.S. Appl. No. 11/188,069.
Office Action dated Feb. 27, 2006 in U.S. Appl. No. 11/188,071.
Office Action dated Mar. 9, 2006 in U.S. Appl. No. 11/188,190.
International Search Report dated Jun. 21, 2001 in related PCT application No. PCT/US01/09923.
European Search Report dated Dec. 8, 2004 in related European Application No. EP 01 92 0834.
Notice of Allowance dated Mar. 28, 2005 in U.S. Appl. No. 10/644,638.
Notice of Allowance dated Oct. 6, 2004 in U.S. Appl. No. 10/644,638.
Notice of Allowance/Examiner Interview Summary Record in U.S. Appl. No. 10/635,817 dated Dec. 5, 2005.
Office Action dated Aug. 2, 2005 in U.S. Appl. No. 10/635,817.
Office Action dated Feb. 23, 2005 in U.S. Appl. No. 10/635,817.
International Search Report dated Dec. 22, 2003 in PCT application No. PCT/EP03/08658.
International Search Report dated Nov. 16, 2004 in PCT application No. PCT/US04/022690.
Coopervisions Complaint for Patent Infringement, Filed Apr. 10, 2006 in the United States District Court Eastern District of Texas, Civil Action No. 2-06CV-149.
CIBA Vision Corporation's Answer and Affirmative Defenses to Coopervision, Inc's Complaint, Filed Jun. 5, 2006 in the United District Court Eastern District of Texas, Civil Action No. 2-06CV-149.
USPTO Office Action dated Oct. 3, 2001, U.S. Appl. No. 09/611,768, filed Jul. 6, 2000, now U.S. Patent 6,431,706.
USPTO Office Action dated Jun. 7, 2004, U.S. Appl. No. 10/171,927, filed Jun. 14, 2002, now U.S. Patent 6,923,538.
European Patent Application No. EP 01 98 3191, European Search Report dated Oct. 12, 2004.
PCT/US01/42682, International Search Report dated Apr. 24, 2002.
PCT/US01/42682, Written Opinion dated Aug. 18, 2003.
PCT/US01/42682, International Preliminary Examination Report dated Mar. 8, 2004.
Bayshore, Charles A., "Soft Toric Lenses We Can Live With", *Contact Lens Forum*, pp. 29-32, Aug. 1992.
Blaze et al., "Fitting Toric Soft Lenses in High Astigmats", *Journal of the Am. Optom. Assoc.*, pp. 902-904, vol. 55, No. 12, Dec. 1984.
J. de Branbander et al., "Clinical Evaluation of a Custom-Made Toric Soft Lens", *Contact Lens and Anterior Eye*, (2000) 23, 22-28, © 2000 British Contact Lens Association.
Ian Davies, "Fitting A Spuncast Soft Toric Contact Lens", Contact Lens Monthly, *Optician*, pp. 36-41, Jan. 11, 1991.
Andrew Gasson, "A Clinical Appraisal of the Zero 6 Toric Soft Lens", Contact Lens Monthly, *Optician*, pp. 19, 21-22, Sep. 4, 1987.
Ross Grant, "The Orientation of Toric Soft Lenses", Specialist Lenses, *Contax*, Sep. 1986.
Ross Grant, "Mechanics of Toric Soft Lens Stabilization", Transactions BCLA Conference 1986, pp. 44-47, supplied by The British Library.
Hanks et al., "The Watermelon Seed Principle" *Contact Lens Forum*, Sep. 1983, pp. 31-35.
Brien A. Holden, "The Principles and Practice of Correcting Astigmatism With Soft Contact Lenses", *Aust. J. Optom.*, 58, pp. 279-299, Aug. 1975.
Payor et al., "An Insider's Look at the Development of a New Soft Toric", *Spectrum*, pp. 48-51, Dec. 1988.
Anthony L. Salvatori, "Bal-Flange® Toric: A New Contact Lens for Non-Rational Orientation", International Contact Lens Clinic, supplied by The British Library, vol. 9, No. 6, pp. 355-358, Nov./Dec. 1982.
Product Information: "Clinical Comparison Proves SofLens66® Toric is Superior to Acuvue® Toric on Stability and Comfort", © 2000 Bausch & Lomb Incorporated.
Product Information: "SofLens66® Toric, It's Clearly More Stable", © 2000 Bausch & Lomb Incorporated.
Art Optical Contact Lens, Inc., "Thinsite™", *Contact Lens Spectrum*, Sep. 1998.
Brian Driffill, "Designing Rigid Contact Lenses", *Optician—Contact Lens Monthly*, Nov. 3, 1989, Dec. 1, 1989 (continued from Nov. 3, 1989) and Jan. 5, 1990 (continued from Dec. 1, 1989).
Ross Grant, "The Orientation of Toric Soft Lenses", *Contax*, pp. 8-10, Sep. 1986.
M. Jalie, "The Specification of Edge Thickness of Contact Lenses", *The Contact Lens Journal*, vol. 10, No. 1, Jan. 1981, pp. 9-16.
Donna La Hood, "Edge Shape and Comfort of Rigid Lenses", *Am. Journal of Optometry & Physiological Optics*, vol. 65, No. 8, pp. 613-618, Copyright 1988 American Academy of Optometry.
Gerald E. Lowther, O.D., Ph.D., "Contact Lenses: Procedures and Techniques", pp. 15-23 and pp. 159-160, Copyright 1982 by Butterworth Publishers, Woburn, Massachusetts.
T.F. Mauger et al., "Beyond 'Average Thickness'", *The Contact Lens Journal*, vol. 10, No. 2, Feb. 1981, pp. 14-15.
Phillips et al., Contact Lenses, Fourth Edition, Chapters 3, 5, 13 & 14, Published by Butterworth-Heinemann, Oxford, England © Reed Educational and Professional Publishing Ltd 1997.
Pierre Rocher, "The Design and Production of PA 4—a modern corneal lens", *The Contact Lens*, vol. 1, No. 1, Oct. 1966, pp. 13-16.

Rostoker et al., "Moulding of Hema Lenses", The Contact Lens Journal, pp. 22-24 (date not available).

Montague Ruben, A Colour Atlas of Contact Lenses & Prosthetics, Second Edition, Chapter 2, Lens Design, pp. 17-31, Wolfe Medical Publications, Ltd., London, England, Copyright 1982.

Montague Ruben, Contact Lens Practice Visual, Therapeutic and Prosthetic—Scleral Contact Lenses pp. 204-256, Published in the USA by The Williams and Wilkins Company, Baltimore, © 1975 Baillière Tindall.

K.R. Shanks,, "A Comparison of Corneal Lenses Supplied to Identical Specifications", *The British Journal of Physiological Optics*, vol. XXIII, 1966, pp. 50-54.

Akira Tajiri, "Impression Technique to Determine Edge Contour of Contact Lenses", *The Contact Lens Journal*, Sep. 1960, vol. 4, No. 9, pp. 391-397.

Joe Tanner, "A new high water content soft toric lens", *Optician*, No. 5549, vol. 211, p. 20-21, May 1996.

Walker et al., "The Design and Examination of Soft Contact Lens Edges", Soft Contact Lens Edges, MOI, Aug./Sep. 1980, pp. 37-39.

Weisbarth et al., "Comparison of Toric Hydrogel Contact Lens Designs", (Publisher unknown) vol. 14, No. 6, pp. 225-231, Jun. 1987.

Wilson et al., "Correction of astigmatism and presbyopia", Contact Lenses in Ophthalmology, Published by Butterworths, Copyright 1988, London, U.K. and Boston, MA, USA.

Tyler's Quarterly Soft Contact Lens Parameter Guide, vol. 14, No. 2, Mar. 1997.

Tyler's Quarterly Soft Contact Lens Parameter Guide, Jun. 1997.

Tyler's Quarterly Soft Contact Lens Parameter Guide, Mar. 1998.

Tyler's Quarterly Soft Contact Lens Parameter Guide, Jun. 1998.

Tyler's Quarterly Soft Contact Lens Parameter Guide, vol. 16, No. 2, Mar. 1999.

Tyler's Quarterly Soft Contact Lens Parameter Guide, vol. 16, No. 3, Jun. 1999.

"SofLens66® Toric is Superior to Acuvue® Toric on Stability and Comfort", Advertisement/product information, 2 pages, © 2000 Bausch & Lomb Incorporated.

"SofLens66® Toric It's Clearly More Stable", Advertisement/product information, 9 pages, © 2000 Bausch & Lomb Incorporated.

Bausch & Lomb Toric, Mark of Excellence™. "Proven products. Powerful Performance", Advertisement/product information, 6 pages, © 2000 Bausch & Lomb Incorporated.

Bayshore, Charles A., "Soft Toric Lenses We Can Live With", Contact Lens Forum, pp. 29-32 (1982).

Blaze et al., "Fitting Toric Soft Lenses High Astigmats", J. Am. Otom. Assoc., pp. 902-904 (1984).

Brabander et al., "Clinical Evaluation of a Custom-Made Toric Soft Lens", Contact Lens and Anterior Eye, pp. 22-28 (2000).

Davies, Ian, "Fitting a Spuncast Soft Toric Contact Lens", Optician, pp. 36-41 (1991).

Gasson, Andrew, "A Clinical Appraisal of the Zero 6 Toric Soft Lens", Optician, pp. 19-22 (1987).

Grant, Ross, "Mechanics of Toric Soft Lens Stabilization", Transactions BCLA Conference, pp. 44-47 (1986).

Hanks, Anthony J., "The Watermelon Seed Principle", Contact Lens Forum, pp. 31-35 (1983).

Holden, Brien A., "The Principles and Practice of Correcting Astigmatism with Soft Contact Lenses", Aust. J. Optom., pp. 279-299 (1975).

Payor et al., "An Insider's Look at the Development of a New Soft Toric", Spectrum, pp. 48-51 (1988).

Salvatori, Anthony L., "Bal-Flange Toric: A New Contact Lens for Non Rational Orientation", International Contact Lens Clinic, vol. 9, pp. 355-358 (1982).

Coopervision Inc.'s First Supplemental Response to CIBA Vision Corporation's Interrogatory No. 8, United States District Court Eastern District of Texas Marshall Division, Civil Action No. 2:06-CV-149 RHC, Served Nov. 20, 2006.

Coopervision Inc.'s Identification of Proposed Terms and Claim Elements for Construction, United States District Court, Eastern District of Texas, Marshall Division, Civil Action No. 2:06-CV-149 RHC. Served on Jan. 16, 2007.

Defendant CIBA Vision Corporation's Proposed Terms and Claim Elements for Construction, United States District Court, Eastern District of Texas, Marshall Division, Civil Action No. 2:06-CV-149 RHC. Served on Jan. 16, 2007.

Defendant CIBA Vision Corporation's Revised Proposed Terms and Claim Elements for Construction, United States District Court, Eastern District of Texas, Marshall Division, Civil Action No. 2:06-CV-149 RHC. Served on Feb. 1, 2007.

Defendant CIBA Vision Corporation's Invalidity Contentions, Exhibit A and Exhibit B, United States District Court, Eastern District of Texas, Lufkin Division, Civil Action No. 9:06-CV-260. Served Feb. 21, 2007.

Coopervision Inc.'s Responses to CIBA Vision Corporation's Second Set of Interrogatories to Coopervision, Inc., United States District Court, Eastern District of Texas, Marshall Division, Civil Action No. 2:06-CV-149 RHC. Served Feb. 26, 2007.

Coopervision's Patent Rule 4-2 Preliminary Claim Constructions and Preliminary Identification of Extrinsic Evidence, Exhibits A.1, A.2, A.3, A.4 & A.5, United States District Court, Eastern District of Texas, Marshall Division, Civil Action No. 2:06-CV-149 RHC. Served Feb. 26, 2007.

Defendant CIBA Vision Corporation's Preliminary Claim Constructions and Preliminary Identification of Extrinsic Evidence, United States District Court, Eastern District of Texas, Marshall Division, Civil Action No. 2:06-CV-149 RHC and Lufkin Division Case No. 9:06-CV-260 RHC. Served Feb. 26, 2007.

Coopervision's Limitation of Claims Pursuant to Court Order, United States District Court, Eastern District of Texas, Marshall and Lufkin Divisions, Civil Action No. 2:06-CV-149 RHC and Case No. 9:06-CV-260 RHC. Served Mar. 7, 2007.

Defendant CIBA Vision Corporation's Amended Invalidity Contentions, Exhibit C, Exibit D & Exhibit E, United States District Court, Eastern District of Texas, Marshall Division, Civil Action No. 2:06-CV-149 RHC. Served Mar. 14, 2007.

Defendant CIBA Vision Corporation's Proposed Terms and Claim Elements for Construction, United States District Court, Eastern District of Texas, Marshall Division, Civil Action No. 9:06-CV-260. Served Mar. 21, 2007.

Defendant CIBA Vision Corporation's Proposed Terms and Claim Elements for Construction From the New Claims of U.S. Patent No. 6,431,706, United States District Court, Eastern District of Texas, Marshall Division, Civil Action No. 2:06-CV-149 and Lufkin Division Case No. 9:06-CV-260 RHC. Served Apr. 2, 2007.

Defendant CIBA Vision Corporation's Preliminary Claim Constructions and Preliminary Identification of Extrinsic Evidence, United States District Court, Eastern District of Texas, Marshall Division, Civil Action No. 2:06-CV-149 and Lufkin Division Case No. 9:06-CV-260 RHC. Served Apr. 4, 2007.

Coopervision's Patent Rule 4-2 Preliminary Claim Constructions and Preliminary Identification of Extrinsic Evidence, Exhibits A.1, A.2 & A.3, United States District Court, Eastern District of Texas, Marshall Division, Civil Action No. 2:06-CV-149 RHC and Lufkin Division Civil Action Case No. 9:06-CV-260 RHC. Dated Apr. 4, 2007.

Defendant CIBA Vision Corporation's Invalidity Contentions for New Claims 1, 4, 8, 15 and 16 of the '706 Patent, United States District Court, Eastern District of Texas, Marshall Division, Civil Action No. 2:06-CV-149 RHC. Served Apr. 30, 2007.

Coopervision Inc.'s Opening Claim Construction Brief, Exhibits A-E and Attachments A and B, United States District Court, Eastern District of Texas, Marshall and Lufkin Divisions, Civil Action No. 2:06-CV-149 RHC and Case No. 9:06-CV-260 RHC. Served May 15, 2007.

Defendant CIBA Vision Corporation's Amended Invalidity Contentions, United States District Court, Eastern District of Texas, Marshall Division, Civil Action No. 2:06-CV-149 RHC. Served Jun. 14, 2007.

Reporter's Transcript of Claim Construction Hearing, vol. 1 of 1, pp. 1 through 236, United States District Court Eastern District of Texas, Marshall and Lufkin Divisions, Civil Action No. 2:06-CV-149 and Civil Action No. 9:06-CV-260. Dated Jun. 27, 2007.

Order on Agreed Claim Terms, United States District Court Eastern District of Texas, Marshall and Lufkin Divisions, Civil Action No. 2:06-CV-149 and Civil Action No. 9:06-CV-260. Filed Jul. 16, 2007.

Coopervision's Technology Synopsis, *CooperVision, Inc.* vs. *CIBA Vision Corporation*, Civil Action No. 2:06-CV-149 and Civil Action No. 9:06-CV-260. (Date not available).

Defendant CIBA Vision Corporation's Technology Tutorial Script, United States District Court, Eastern District of Texas, Marshall and Lufkin Divisions, Civil Action No. 2:06-CV-149 RHC and Case No. 9:06-CV-260 RHC. (Date not available).

Memorandum Opinion and Order Construing Claim Terms of United States Patent Nos. 6,431,706; 6,923,538; 6,467,903; 6,857,740; 6,971,746; 7,133,174; and 7,134,753, United States District Court Eastern District of Texas Marshall Division, Civil Action No. 2:06-CV-149 and Civil Action No. 9:06-CV-260, Filed Jul. 16, 2007.

Defendant CIBA Vision Corporation's Objections to Memorandum and Order Construing Claim Terms of United States Patent Nos. 6,431,706; 6,923,538; 6,467,903; 6,857,740; 6,971,746; 7,133,174; 7,133,174; and 7,234,753, United States District Court, Eastern District of Texas, Marshall Division Civil Action No. 2:06-CV-149 RHC and Lufkin Division Civil Action No. 9:06-CV-260 RHC. Served Jul. 30, 2007.

*Coopervision, Inc.* vs. *CIBA Vision Corporation* before the honorable Judge Earl Hines Jun. 27, 2007.

Toric Patents, *Coopervision, Inc.* v. *CIBA Vision Corporation*, 2:06CV-149 and 9:06-CV-260. Date not available.

Edge Design Patents, *Coopervision, Inc.* v. *CIBA Vision Corporation*, 2:06CV-149 and 9:06-CV-260. Date not available.

Defendant CIBA Vision Corporation's Fourth Set of Supplemental Objections and Responses to Plaintiff's First Set of Interrogatories—pp. 1 and 18-21, United States District Court, Eastern District of Texas, Marshall Division, Civil Action No. 2:06-CV-149. Date not available.

Defendant CIBA Vision Corporation's Amended Invalidity Contentions for Claims 2 and 7 of the '538 Patent and Claims 1,4,8,14 and 15 of the '706 Patent and Exhibits A & B, United States District Court, Eastern District of Texas, Marshall Division, Civil Action No. 2:06-CV-149 RHC. Served Sep. 4, 2007.

Defendant CIBA Vision Corporation's Invalidity Contentions for Claim 25 of the '174 Patent and Claims 15 and 22 of the '753 Patent and Exhibits A & B, United States District Court, Eastern District of Texas, Lufkin Division, Civil Action No. 9:06-CV-260 RHC. Served Sep. 4, 2007.

Defendant CIBA Vision Corporation's Invalidity Contentions for Claim 38 of the '903 Patent and Claim 8 of the '740 Patent and Exhibits A & B, United States District Court, Eastern District of Texas, Marshall Division, Civil Action No. 2:06-CV-149 RHC. Served Sep. 4, 2007.

CIBA Vision Corporation's Third Amended Answer and Affirmative Defenses to Coopervision, Inc.'s Complaint, United States District Court, Eastern District of Texas, Marshall Division, Civil Action No. 2:06-CV-149. Served Oct. 23, 2007.

Guy Whittaker, "A clinical evaluation of the Biomedics Toric", Contact Lens Monthly, *Optician*, Sep. 6, 2002, No. 5867, vol. 224, 4 pages.

Professional Fitting Guide: Hydron®UltraT (polymacon B)—Toric Hydrophlic Contact Lens for Daily Wear, 10 pages, © 1991 Allergan, Inc.

Opti-Centre Laboratories: UltraVue 2000T Advertisement and Professional Fitting Guide for UltraVue 2000T—Soft Multifocal—Toric Contact Lenses for Daily Wear dated Jan. 8, 2001; Package Inserts dated May 27, 2003 and Jul. 14, 2003; and drawings dated Mar. 29 & 30, 2001.

Tyler's Quarterly Soft Contact Lens Parameter Guide, vol. 13, No. 2, pp. 4-5 & 20-23, Mar. 1996.

Product Spectrum, "SofLens66 Toric", Contact Lens Spectrum, Jan. 1999, p. 53.

Bausch & Lomb, FormCast™ Manufacturing Process, "Reliable, Flexible and Economical Production of Toric Lenses", © 2000 Bausch & Lomb Incorporated SL2489 3/00; and Bausch & Lomb, Lo-Torque™ Design, "Exceptional Stability and Optimal Visual Acuity in Toric Lenses", © 2000 Bausch & Lomb Incorporated SL2490 3/00.

Glossary: International Organization for Standardization (ISO), "Optics and optical instruments—Contact Lenses—Vocabulary and symbols", First Edition—Sep. 15, 1986, 16 pages.

Glossary: International Organization for Standardization (ISO), "Contact lenses and contact lens care products—Vocabulary—Part I: Contact Lenses", First Edition—Jun. 1, 2003, 36 pages.

"Coopervision's Rebuttal Claim Construction Brief", *Bausch & Lomb Incorporated* v. *CooperVision, Inc.*, In the United States District Court for the Western District of New York, Civil Action No. 04-CV-6485 L (F), 10 pages, dated Nov. 2, 2005.

ISO (International Organization for Standardization), Joint Meeting: Contact Lenses I—Copenhagen, May 1994, ISO 8320 Revision—Vocabulary and symbols, 23 pages.

* cited by examiner

CONTACT LENS HAVING A UNIFORM HORIZONTAL THICKNESS PROFILE

CROSS-REFERENCE TO RELATED APPLICATIONS

This application is a continuation-in-part of application Ser. No. 11/188,071, filed Jul. 22, 2005, which is a continuation of application Ser. No. 10/827,168, filed Apr. 19, 2004, now U.S. Pat. No. 6,971,746, which is a continuation of application Ser. No. 10/171,718, filed Jun. 14, 2002, now U.S. Pat. No. 6,857,740, which is a continuation of application Ser. No. 09/818,244, filed Mar. 27, 2001, now U.S. Pat. No. 6,467,903, which claims the benefit of U.S. provisional application No. 60/193,493, filed Mar. 31, 2000.

This application is a continuation-in-part of application Ser. No. 11/127,584, filed May 11, 2005, which is a continuation of application Ser. No. 10/171,927, filed Jun. 14, 2002, now U.S. Pat. No. 6,923,538, which is a continuation of application Ser. No. 09/611,768, filed Jul. 6, 2000, now U.S. Pat. No. 6,431,706.

The disclosure of each of these applications is incorporated in its entirety herein by reference.

BACKGROUND OF THE INVENTION

The present invention relates to contact lenses and, in particular, to an improved ballast, preferably a prism ballast, for toric lenses that imposes a low-torque rotational correction on the lens.

Astigmatism is a defect in the eye that is corrected by a lens with a non-spherical prescription. The prescription, which is usually expressed as cylinder on the patient's prescription order, causes at least a portion of the surface of the lens to have the shape of the toric segment. A torus is a surface or object defined by the rotation of a circle about an axis other than its own. For example, a donut has a toroidal shape. The toric portion of the lens is a small oval-shaped section of the toroid, with a major axis and a minor axis. As a result of this non-axi-symmetric configuration, proper rotational orientation of the lens must be maintained. It should be noted that other lenses, for instance that provide bifocal or multi-focal correction, are non-axi-symmetric and thus have a particular orientation outside of which performance suffers.

Astigmatism is often associated with other refractive errors such as myopia or hypermetropia, and so toric contact lenses often also provide some spherical correction, negative or positive. While the concave or posterior surface of a contact lens generally has a spherical configuration, where the lens is used to correct astigmatism the posterior surface will usually have the toric configuration. That is, the curved portion of the posterior surface of the lens has a major axis and a minor axis. The radius of curvature of the posterior surface of the lens is larger in the major-axis direction than in the minor-axis direction. The major diameter of the toric surface is generally smaller in diameter than the overall lens, and is cut into a starting spherical base curve. Additionally, the anterior and/or posterior surface(s) of the optical zone may include a spherical portion that contributes to a distance refractive correction. The spherical correction is typically provided on the exterior or anterior surface. Of course, certain prescriptions provide the toric curve on the anterior surface, with the spherical correction also on the anterior surface, or on the posterior surface.

While spectacle lenses are held rigidly in place by a frame, toric contact lenses must be stabilized so that the cylindrical correction is stabilized in substantially the correct position on the eye. Soft contact lenses which had been designed for use to correct astigmatism are well-known in the art. Generally, these lenses rely on some type of ballasting or stabilizing method to cause the lens to be properly oriented in the eye. The ballast is typically provided on a contact lens by incorporating structures either on the front surface or on the back surface, or spread between both surfaces. Such orientation structures utilize eyelid forces generated during blinking. As the eyelids wipe across the contact lens, they tend to squeeze the lens down and against the cornea and displace elevated surface features.

A so-called "wedge" or "prism" ballast may be utilized wherein the lower or inferior portion of the lens is relatively thicker than the upper or superior portion. As a result, the upper eyelid, which undergoes greater movement than the lower eyelid, and thus exerts greater influence on the contact lens, tends to displace the inferior portion of the contact lens downward, inherently rotating the contact lens over the cornea into the intended orientation. Alternatively, the lens may incorporate a so-called "periballast" (short for peripheral ballast) stabilization that involves a ballast region surrounding but excluding the central optic.

For examples of prism ballast, see U.S. Pat. Nos. 4,573,774, 5,125,728, and 5,020,898, and PCT Publication No. WO 98/45749. Another orientation structure for contact lenses includes the provision of thin superior and inferior zones relative to a thicker central zone. Such structures are shown in U.S. Pat. Nos. 4,095,878, and 5,650,837. Alternatively, channels or ridges may be provided on the contact lens, such as seen in PCT publication No. AU 92/00290.

U.S. Pat. No. 5,020,898 describes a toric contact lens with ballast distributed outside the anterior optical zone such that the ballast thickens from the top of the lens to two points of maximum thickness proximate the lower peripheral edge.

U.S. Pat. No. 5,125,728 also describes a ballast portion that increases from a superior part of the lens to a maximum thickness in the lower periphery on each side thereof. The maximum thickness of the ballast is located as close as possible to the lens edge so that these portions fit over the peripheral cornea and conjunctiva to limit lens rotation. A ballast-free corridor of least resistance is provided in the vertical mid-section of the lens above and below the central optical area. The patent asserts that the ballast-free corridor in combination with the thicker ballast and thicker portions close to the lens periphery provides an improved stabilization mechanism.

Finally, PCT Publication No. WO 98/45749 describes a ballast lens with a prism through the optical zone. The anterior and posterior optical zone diameters are selected such that when combined to form a lens, the thickness at the superior and inferior junctions of the optical zone on the anterior face is controlled.

In addition to the relative ability of a lens to orient consistently on cornea, other factors affect the performance of the various stabilization structures. For example, some structures are better than others with respect to one or more of the following: reducing the overall thickness across the toric contact lens for the physiological benefit of the wearer, ease of manufacture, reducing the lens parameter inventory, clinical performance including wearer comfort and consistency of fitting between refractive powers. With respect to wearer comfort, in general, the thinner the lens and the smoother the surface, the more comfort will be provided. In addition, it is known to provide a periphery on the lens that is relatively thin and shaped for added comfort.

The principal limitation of existing toric contact lens designs is that orientation is highly variable and/or uncomfortable, for a given design, between individual toric lens wearers. Besides the lens design and lens material, patient factors also influence the orientation of a toric contact lens on the eye and contribute to this variability in lens orientation. Patient factors such as blink characteristics and ocular parameters such as eyelid, corneal, and conjuctival shape and anatomy may result in undesired interaction (for example, asymmetry) or insufficient interaction with the contact lens. However, many of the problems associated with prior art mechanisms may be attributed to problems with failure of the stabilization mechanism to maximize eyelid interaction and reduce the variability of lens orientation between individuals.

Despite much effort in this area, there is still a need for a toric contact lens that has more consistent stabilization features between individuals.

SUMMARY OF THE INVENTION

In accordance with the present invention, a contact lens having improved thickness and ballast arrangement is provided. The contact lens of the present invention reduces the known variability of lens orientation from individual to individual. Further, the lenses of the present invention provide more effective interaction between the stabilization mechanism and the eyelid during blinking, and preferably include a peripheral zone that is required for wearer comfort.

In one aspect, therefore, the present invention provides a contact lens, including a contact lens body having a generally spherical base curvature with a convex anterior face, a concave posterior face, and a peripheral edge therebetween. A peripheral zone is defined adjacent the peripheral edge of the anterior face. The body has a thickness between the anterior face and the posterior face and is non-axi-symmetric so as to define a superior edge and an inferior edge. Further, a vertical meridian is defined from the superior edge toward the inferior edge and a horizontal meridian is defined perpendicular thereto. The anterior face defines a plurality of zones thereon, including an inner zone circumscribed by the peripheral zone, and an optic zone defined generally in the middle of the inner zone. Additionally, the lens includes a prism ballast portion whereby the thickness increases parallel to the vertical meridian from the superior edge toward the inferior edge in at least a ballast portion of the inner zone. The inner zone comprises a superior portion between the optic zone and the superior extent of the inner zone, an inferior portion between the optic zone and the inferior extent of the inner zone, and an intermediate portion between the superior and inferior portions. The ballast portion is defined within one or more of the superior, intermediate, and inferior portions and has a series of consecutive horizontal cross-sections exclusive of the peripheral zone and optic zone spanning a distance along the vertical meridian of at least 20% of the smallest dimension of the superior, intermediate, and inferior portions as measured along the vertical meridian, wherein each horizontal cross-section has a substantially uniform thickness not varying by more than about 30 µm or 20%, whichever is greater in absolute terms. In one embodiment, the thickness of the contact lens in each of the consecutive horizontal cross-sections does not vary by more than about 15 µm or about 10%, whichever is greater in absolute terms.

In one embodiment, the ballast portion is defined wholly within only one of the superior, intermediate, and inferior portions. In another embodiment, the ballast portion is defined wholly within only two of the superior, intermediate, and inferior portions. In still another embodiment, the ballast portion is defined within all three of the superior, intermediate, and inferior portions, or comprises the entire inner zone.

In a preferred embodiment, a rate of change of thickness in the tapered peripheral zone is less than about 250 µm/mm, more preferably less than about 200 µm/mm.

In an alternative embodiment, a contact lens of the present invention comprises a contact lens body having a generally spherical base curvature with a convex anterior face, a concave posterior face, and a peripheral edge therebetween. A peripheral zone is defined adjacent the peripheral edge of the lens that tapers thinner toward the peripheral edge of the lens. The lens body has a thickness between the anterior face and the posterior face and is non-axi-symmetric so as to define a superior edge and an inferior edge. A vertical meridian is defined from the superior edge toward the inferior edge and a horizontal meridian is defined perpendicular thereto. The anterior face defines a plurality of zones thereon, including an inner zone circumscribed by the peripheral zone and having a prism ballast portion therein, and an optic zone defined generally in the middle of the inner zone, wherein the thickness increases parallel to the vertical meridian from the superior edge toward the inferior edge in at least the prism ballast portion of the inner zone. Along a 225° meridian, the distance between the inner zone and the peripheral edge is less than about 1.4 mm.

In accordance with one aspect of the invention, a molded contact lens includes a fully molded contact lens body (i.e., molded on both the anterior and posterior faces) having the general features as described above. As before, the molded lens has a prism ballast portion in the inner zone and, along a 225° meridian, the distance between the inner zone and the peripheral edge is less than about 1.8 mm. Alternatively, or desirably in addition, and along a 270° meridian, the distance between the inner zone and the peripheral edge is less than about 2.1 mm, while along a 180° meridian, the distance between the inner zone and the peripheral edge is less than about 1.3 mm.

Desirably, a band circumscribed by the peripheral zone and around the optic zone is substantially annular. Namely, a superior distance A is defined along the vertical meridian and within the inner zone from the optic zone to the peripheral zone. An inferior distance B is defined along the vertical meridian and within the inner zone from the optic zone to the peripheral zone. For molded prism ballasted lenses the band is annular within the range of $0.33A \leq B \leq A$, while for all prism ballasted lenses the annular band is within the range of $0.55A \leq B \leq A$.

In addition, a method is provided for fully cast molding contact lenses having rounded edge surfaces. Advantageously, by implementation of the present invention, lenses can be created with an edge form providing enhanced comfort and/or safety without the need for costly and time consuming post formation processing steps.

Generally, methods for producing contact lenses, in accordance with the present invention comprise providing a tooling insert or tool, for example, a back surface tool, having a surface generally corresponding to a desired contact lens surface and a convex curve along an outer or peripheral radius thereof. The tool is used to form a mold section which generally defines a negative impression of a surface of the final lens product. For example, the tool is positioned in a molding apparatus, such as a molding apparatus of conventional design. A moldable composition, such as a polymeric material or a precursor composition of a polymeric material, is introduced into the molding apparatus and subjected to conditions effective to form a mold section having a negative impression of the surface of the tool. The mold section formed by the tool is a back surface mold section. In other words, the surface of the tool generally corresponds to a face, preferably the posterior face, of the contact lens to be formed. Thus, the tool may be a back surface tool generally defining the base curve of the contact lens product. As will be described in more detail hereinafter, the convex curve of the tool, when used to form a back surface mold section, provides a contact lens having the desired rounded edge form without the need for post formation processing steps.

For example, to form the rounded edge contact lens, the back surface tool having the convex curve along the outer radius thereof is positioned in a molding apparatus, for example, a conventional, injection molding apparatus. A first mold section having a negative impression of the surface of the tool is formed. This first mold section is assembled with a second mold section. The second mold section may be made in a conventional manner and preferably generally defines a negative impression of a front, or anterior, surface of the contact lens to be produced. The assembled first and second mold sections form a lens-shaped cavity, and the method includes forming a contact lens member in the lens shaped cavity of the assembled mold sections. Upon demolding or removal from the mold sections, a fully molded, contact lens member having a rounded edge form or surface is obtained.

The demolded contact lens member may be the final contact lens. However, the demolded contact lens member may be hydrated or further hydrated to form the final contact lens with a rounded edge surface. One important advantage of the present invention is that the present contact lenses preferably do not require post-formation (after being molded) processing to alter the rounded configuration of the outer peripheral edge surface of the contact lens member or contact lens. Post-formation processing such as demolding, hydration, sterilization, packaging and the like of the contact lens or contact lens member does not alter this rounded edge surface configuration.

The portion of the back surface tool that forms the lens periphery is convex in form, preferably having a radius of at least about 0.05 mm or larger. Correspondingly, the first mold section formed by the tooling insert has a concave outer edge surface. It will be appreciated by those skilled in the art that both the tooling insert and the mold section formed thereby, in accordance with the present invention, are significantly different in form from conventional back surface tooling inserts and conventionally produced back surface mold sections.

Preferably, in accordance with the present invention, a junction angle formed between the assembled first and second mold sections, on the lens side of the lens-shaped cavity, is at least about 100 degrees, more preferably in the range of about 100 degrees to about 170 degrees.

The present invention further provides a tool, preferably a back surface tool, useful for cast molding a contact lens, for example, a contact lens having a rounded peripheral edge surface in making a mold section. In accordance with this embodiment of the invention, the tool generally comprises an insert adapted to be placed in a molding apparatus in forming a first mold section, specifically a back surface mold section, having a negative impression of a surface of the tool. To form the rounded edge surface of the final lens product, the surface of the tool includes a first surface portion in the general shape of a lens face, preferably a posterior lens face, of a contact lens, and a second surface portion defining a convex curved outer peripheral edge surface of the insert. The second surface portion may be defined by a continuous curve with a radius of curvature of about 0.05 mm. Alternatively, the second surface portion may be defined by a series of small flats, or a combination of small flats and curves, which approximate a convexly curved surface.

In another aspect of the present invention, a mold useful in producing, e.g., cast molding, a contact lens, preferably, a contact lens with a rounded edge surface, is provided. The mold generally comprises a first mold section having a surface in a general shape of a negative of a lens face, preferably a posterior lens face, of a contact lens to be cast molded using the mold and a concave outer edge surface, and a second mold section having a surface in a general shape of a negative of an opposing lens face, preferably an anterior lens face of the contact lens to be cast molded using the mold. The first mold section and the second mold section are adapted to be assembled together, for example, in a conventional manner, to define a cavity, in which is formed a fully cast molded, rounded edge contact lens or contact lens member in accordance with the present invention.

In a further aspect of the present invention, fully cast molded contact lenses having rounded peripheral edge surfaces are provided. Such contact lenses may be produced using the methods, tools and molds described herein.

Each and every feature described herein, and each and every combination of two or more of such features, is included within the scope of the present invention provided that the features included in such a combination are not mutually inconsistent.

The invention, together with additional features and advantages thereof, may best be understood by reference to the following description taken in connection with the accompanying illustrative drawings in which like parts bear like reference numerals.

DESCRIPTION OF THE PREFERRED EMBODIMENTS

The present invention provides stabilized contact lenses, especially contact lenses having a cylindrical correction for astigmatism. More broadly, the present invention provides contact lenses having elevated surfaces thereon that interact with the blinking action of the eyelids to rotationally stabilize the lens. The rotational stability is useful for any contact lens that is non-axi-symmetric. For example, the rotational orientation of toric lenses or multifocal lenses must be maintained for proper correction. It should be understood, however, that rotational stability may also be desirable for other specialized lenses.

In the following description, a number of surfaces and thicknesses of the contact lenses of the present invention will be described with reference to schematic elevational views of the lenses, in that the lenses have been flattened. Contact lenses typically possess an underlying spherical curvature, with the anterior face being convex, and the posterior face being concave. The various surfaces and optic zones are then either molded or machined from the base sphere. For simplicity, the elevational views shown herein are flattened, with the base sphere removed. In this way, the lines of shading corresponding to the underlying spherical curvature are removed so that the particular surfaces and thicknesses of the present invention can be more clearly illustrated. In a preferred embodiment, lenses of the present invention have a negative spherical power distance correction, and a toric surface for cylindrical correction.

Figure 1:
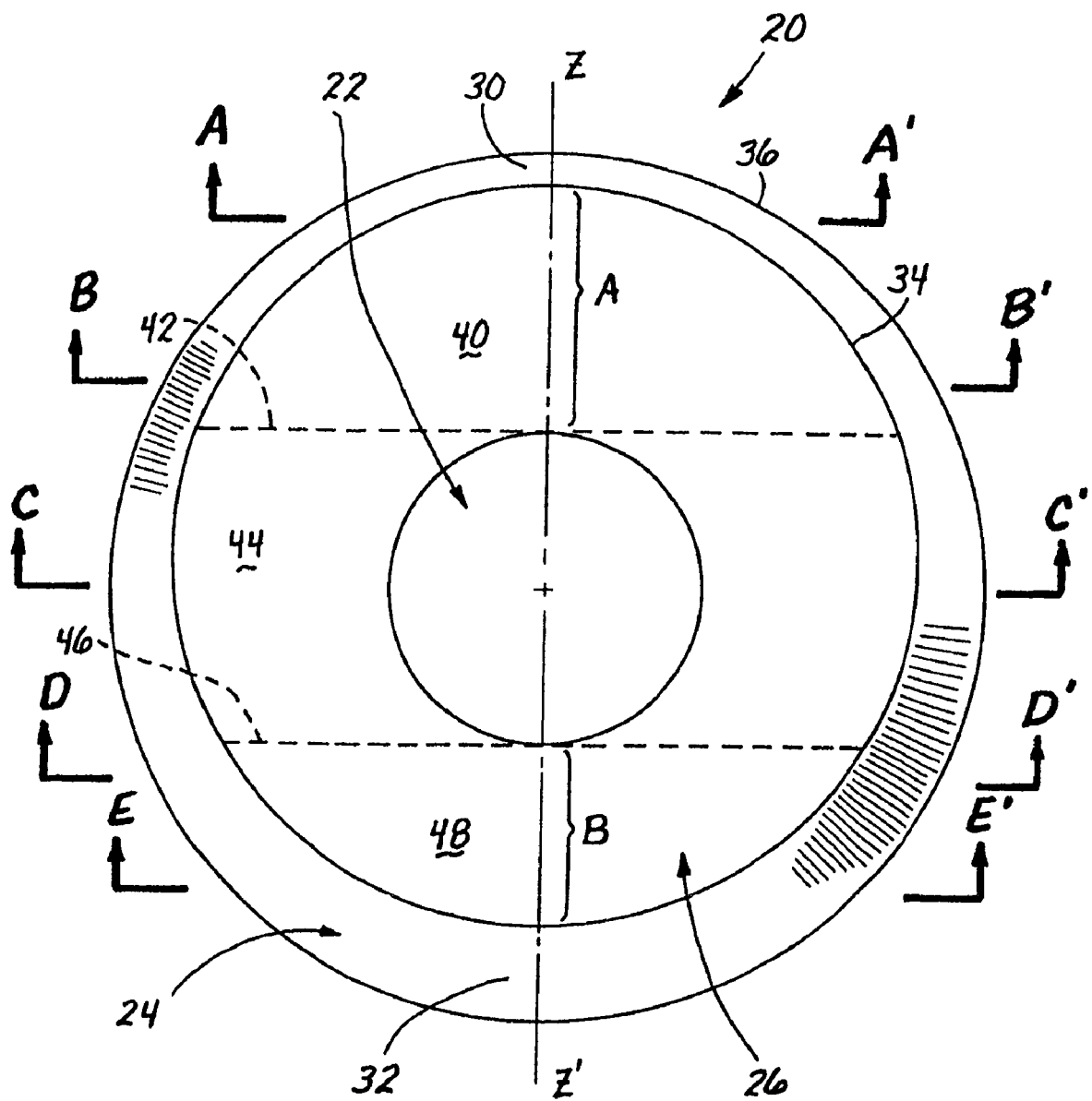
FIG. 1 is a schematic front elevational view of a contact lens according to the present invention illustrating various zones defined thereon.

An exemplary contact lens 20 of the present invention is thus shown in schematic elevational view in FIG. 1 flattened without shading to illustrate various zones thereon. The lens 20 includes a lens body of suitable soft or rigid material. Soft contact lenses are typically made of a hydrophilic material such as hydroxyethylmethacrylate, metallo-organic substances, silicone rubbers, silicone hydrogels, urethanes, etc. Alternatively, a rigid gas-permeable material such as siloxane acrylate or fluorosiloxane acrylate may be used. The lens body has an overall spherical curvature with a concave posterior face adapted to contact the cornea opposite an outwardly-facing convex anterior face.

With reference to FIG. 1, the lens 20 includes an optic zone 22, a peripheral zone 24, and an inner zone 26 circumscribed by the peripheral zone, wherein the optic zone 22 forms a portion of the inner zone 26. Alternatively, the inner zone 26 may be defined between the optic zone and the peripheral zone. As will be described further herein, the optic zone 22 may be circular, toroidal, or other special shapes. The peripheral zone 24 may have a uniform radial dimension (width), or the radial dimension may vary. In the exemplary illustrated embodiment, the peripheral zone 24 has a narrower radial dimension at a superior end 30, and a wider radial dimension at an inferior end 32. Stated another way, the inner zone 26 has a circular periphery or ballast periphery 34 that is slightly offset toward the top of the lens 20 along a vertical meridian or centerline Z-Z' therethrough. It should be noted that the clear delineations in the drawings between the optic zone 22 peripheral zone 24 and inner zone 26 should not be taken to imply that there is a discontinuity or corner at those locations, and in fact the exemplary lens of the present invention possesses gradually curved transitions between the zones.

A lens edge 36 defines the intersection of the anterior and posterior faces. The peripheral zone 24 desirably exhibits a taper so as to be thinner at the lens edge 36 than at the circular ballast periphery 34. In this regard, the peripheral zone 24 preferably defines a partial conical surface (albeit, superimposed on the underlying spherical curvature). Alternatively, the peripheral zone 24 may define a partial spherical or other curvature (i.e., shape), for example, any suitable curvature.

Various features of the lens 20 are believed to enhance wearer comfort in comparison to other similar lenses. Indeed, certain clinical trials resulted in findings that patients responded more favorably to questions designed to ascertain a comfort level of lenses made according to the present invention than with respect to questions on the comfort level of similar lenses.

The inner zone 26 may be segregated into three parts along the vertical meridian Z-Z'. Specifically, a superior portion 40 extends between the upper extent of the ballast periphery 34 and the upper extent of the optic zone 22, delineated by an imaginary line 42, perpendicular to the vertical meridian Z-Z'. An intermediate portion 44 extends between the perpendicular line 42 and a second perpendicular line 46 at the lower extent of the optic zone 22. Finally, an inferior portion 48 extends between the perpendicular line 46 and the lower extent of the ballast periphery 34. The optic zone 22 thus lies entirely within the intermediate portion 44.

The superior portion 40, intermediate portion 44, and inferior portion 48 are used in the present application to segregate the inner zone 26 into discrete areas in which specific ballast surfaces can be provided. It should be understood, however, that the dividing lines 42, 46 between the areas may be shifted, or may be non-linear, for that matter. In one aspect, the present invention concerns particular ballast or prism ballast surfaces/thicknesses in one or more portions of the inner zone 26, which portions may be defined in a number of ways. Therefore, the reader will understand that the portions 40, 44, and 48 are shown as exemplary only. Desirably, iso-thickness ballast surfaces are formed in at least 20% (measured as a percent of the vertical dimension), preferably at least 50%, and more preferably at least 100%, of at least one of the portions 40, 44, and 48. More specifically, an iso-thickness prism ballast portion is defined within one or more of the superior, intermediate, and inferior portions 40, 44, and 48 as a series of consecutive horizontal cross-sections exclusive of the peripheral zone and optic zone spanning a distance along the vertical meridian of at least 20% of the smallest dimension of the superior, intermediate, and inferior portions as measured along the vertical meridian. The term "iso-thickness" means that each of the consecutive horizontal cross-sections has a substantially uniform thickness not varying by more than about 30 μm or 20%, whichever is greater in absolute terms. In a particularly preferred construction, ballast surfaces are provided in at least two, more preferably all three of the portions 40, 44, and 48.

The present invention pertains to contact lenses having rotational stabilization mechanisms thereon, including those with ballasts, e.g., prism ballasts, periballasts, and so-called "dynamically stabilized" lenses. A ballasted lens provides some raised surface contour over which the eyelid wipes to re-orient the lens, generally about its optical axis. A prism ballast provides a wedge or tapered ballast for interaction with the eyelids even in the optic, while a periballast is exclusive of the optic. Dynamic stabilization involves superior and inferior flats on the lens leaving a thickened midsection to interact with the eye, as seen in U.S. Pat. No. 4,095,878. Those of skill in the art will also recognize that there may be other such stabilization mechanisms with which the present invention could be advantageously used.

Figure 2:
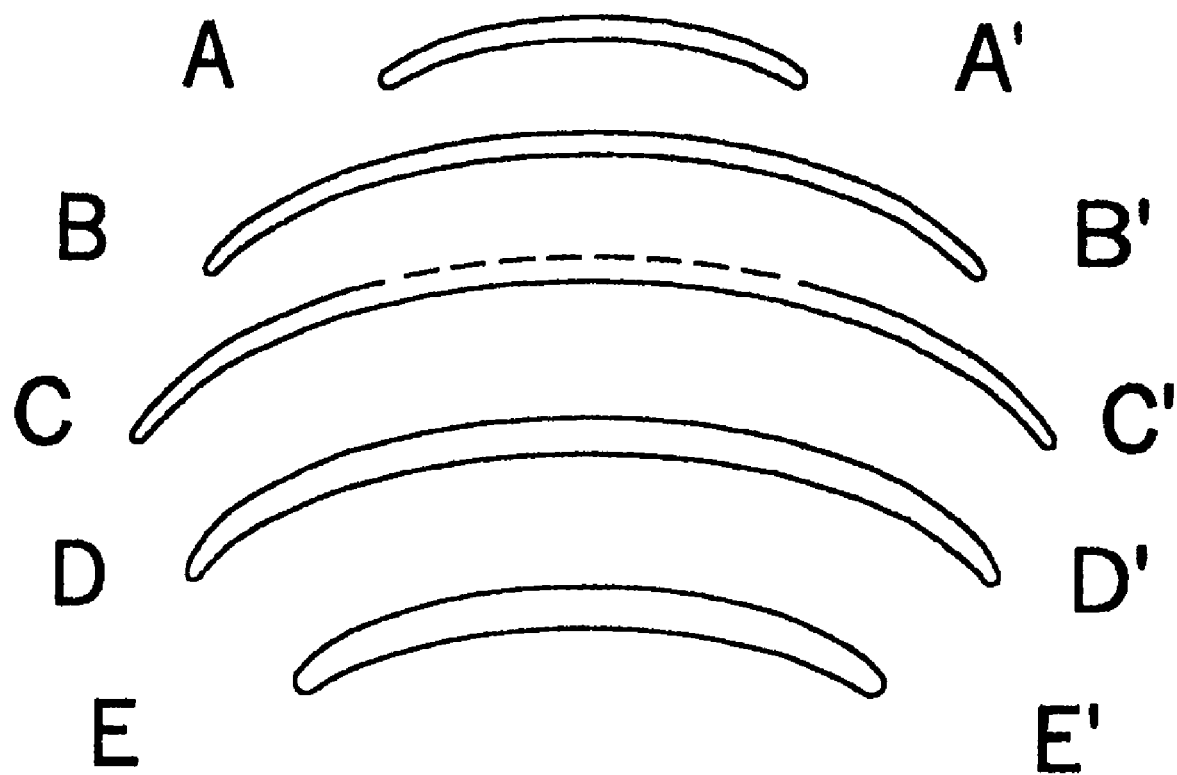
FIG. 2 (A-A' to E-E') illustrate a series of horizontal cross-sections taken through the lens of FIG. 1.

FIG. 1 also illustrates a number of representative cross-sectional lines A-A', B-B', C-C', D-D', and E-E' extending perpendicularly with respect to the vertical meridian Z-Z' (i.e., horizontally). These sections are illustrated in FIG. 2, with the base spherical curvature shown. The present invention provides that consecutive horizontal cross-sections shown in FIG. 2 that possess ballast each has a substantially uniform or iso-thickness, except in the optic zone 22 and peripheral zone 24. For example, one of the cross-sections in FIG. 2 having ballast, such as D-D', has a substantially uniform thickness. Alternatively, all of the cross sections shown in FIG. 2 that possess ballast may have a uniform thickness except in the optic zone 22 and peripheral zone 24.

Desirably, the sections of substantially uniform thickness do not vary in thickness within one section by more than about 30 μm or about 20% whichever is greater in absolute terms. In one embodiment, the thickness of the sections varies by no more than about 15 μm or about 10%, such as by no more than about 10 μm or about 7%, whichever is greater. Such variations will be understood to be sufficiently small that the sections can still be regarded as being of "substantially uniform" thickness.

In an exemplary embodiment of the present invention, the contact lens 20 has a so-called prism ballast superimposed thereon within the entire inner zone 26. That is, from the intersection of the ballast periphery 34 with the vertical meridian Z-Z' at the top of the lens 20, to the intersection between the same two lines at the bottom of the lens, the thickness generally increases. This thickness distribution along the vertical meridian Z-Z' is graphically illustrated in FIG. 3, with the superior end 30 of the peripheral zone 24 shown at the right and the inferior end 32 shown at the left. Starting at the right side, the taper of the peripheral zone 24 within the superior end 30 from the edge 36 to the upper extent of the ballast periphery 34 is seen. In the superior portion 40, the thickness gradually increases to the horizontal line 42. The thickness further increases through the optic zone 22 to the horizontal line 46. The greatest thickness is in the inferior portion 48 to the lower extent of the ballast periphery 34. The lens again tapers downward within the peripheral zone 24 between the ballast periphery 34 to the inferior edge 36.

Figure 3:
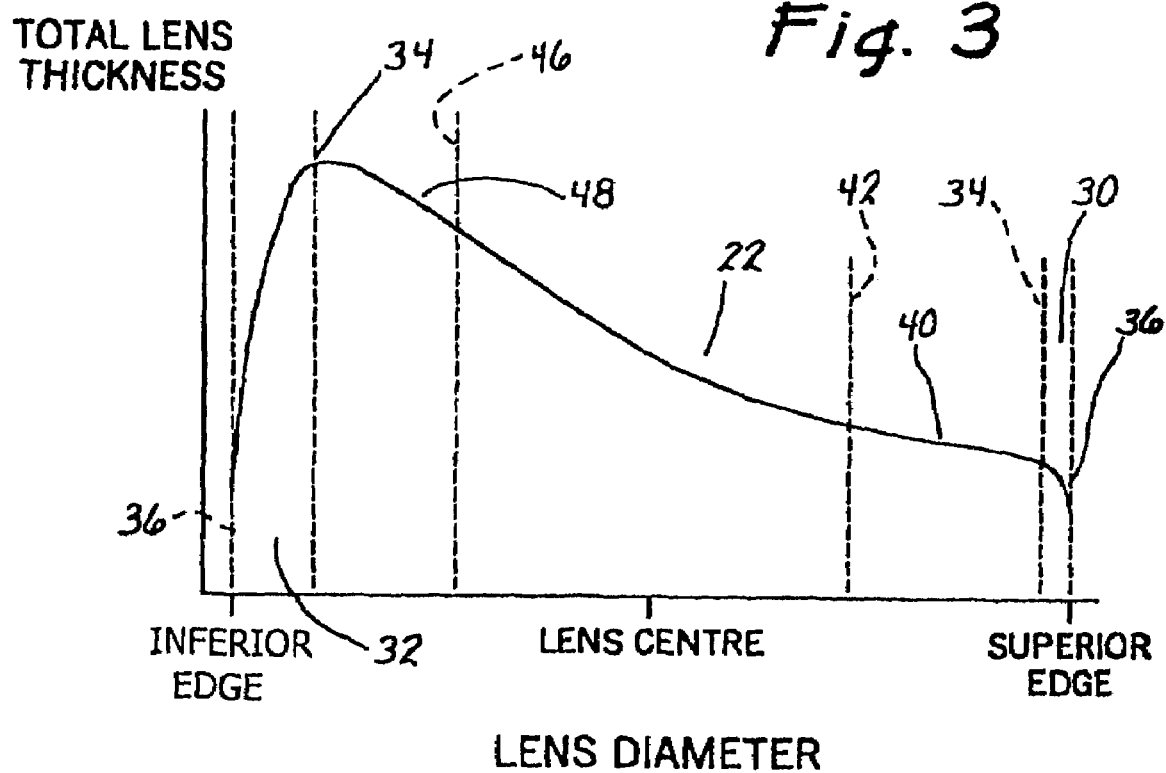
FIG. 3 is a graph showing the varying thickness of the contact lens of FIG. 1 taken along a vertical meridian Z-Z'.

The thickness distribution represented in FIG. 3 thus corresponds to a prism ballast within the lens 20 that extends through all of the superior portion 40, intermediate portion 44, and inferior portion 48. Indeed, even the optic zone 22 exhibits this prism ballast. Importantly, the present invention provides a prism ballast in at least one of these portions 40, 44, 48 having horizontal cross-sections of uniform thickness. Therefore, as seen in FIG. 2, all of the cross-sections illustrated have uniform thicknesses along their widths, except in the peripheral zone 24. Of course, because of the increasing thickness in the superior-inferior direction parallel to the vertical meridian Z-Z', the thickness of each cross-section increases from cross-section A-A' to cross-section E-E'.

The uniform thickness in the horizontal cross-sections helps to stabilize lenses of the present invention, in contrast to previous lenses. More specifically, lenses of the present invention are suitable for a greater number of wearers than those of the prior art because of the lower torque exerted by the eyelids on the lens by virtue of the uniform thickness or iso-thickness configuration. The iso-thickness ballast arrangement maximizes eyelid interaction by achieving an even contact across each section of the lens as the eyelid travels down and up the lens during blinking. In contrast, the eyelid generates more rotational torque during a normal blink when interacting with horizontal lens sections of non-uniform thickness, as in the prior art. This is because for a lens to orient appropriately on the eye the lens-eyelid interaction should be maximized across the lens (i.e., across each horizontal cross-section) so that the lens is squeezed into the desired orientation (overall orientation) and undergoes minimal fluctuation during blinking (interblink orientation).

Prior art lenses, having narrow peaks or points of maximum thickness on either side of the vertical meridian are more likely to create a non-uniform lens-eyelid interaction across horizontal sections. In addition, the horizontal distance between peaks of maximum thickness in the prior art lenses typically increases from a superior portion to the horizontal midline, and then decreases from the mid-line to the inferior portion. This further varies the lens-eyelid interaction forces.

The uniform thicknesses in the horizontal cross-sections of the lens 20 have proven to enhance performance of the lenses in comparison to other similar lenses in terms of maintaining a correct rotational orientation in the eye. Clinical trials have shown that there is less variability in the position of a location mark on the lens over time. For example, groups of 20 people at a time were studied to determine the positions of location marks over time on various lenses in the eye, and the standard deviations of the positions of the location marks were determined. The results are that the standard deviation for lenses of the present invention are measurably smaller than in other lenses, meaning the present lenses had less rotational instability in the eye.

Figure 4B:
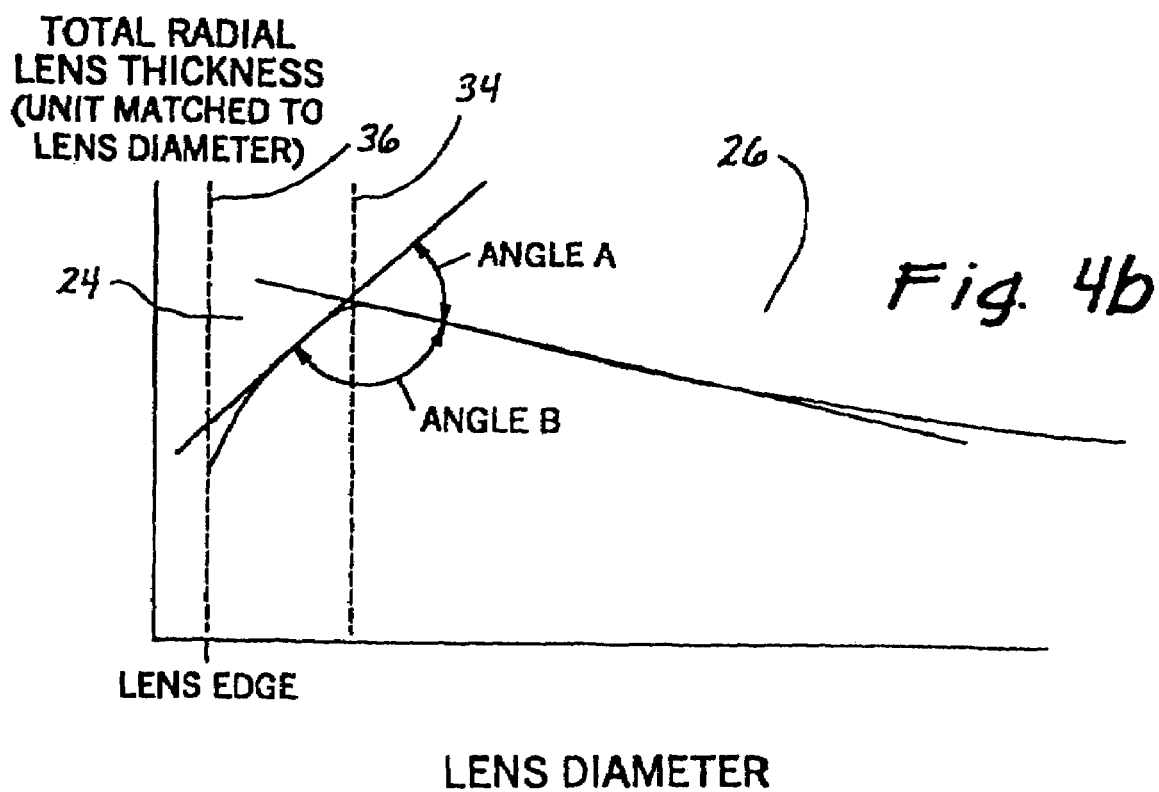
FIG. 4b is a graph of a portion of the contact lens of the present invention illustrating a discontinuity and angular relationship between zones thereon.
Figure 4A:
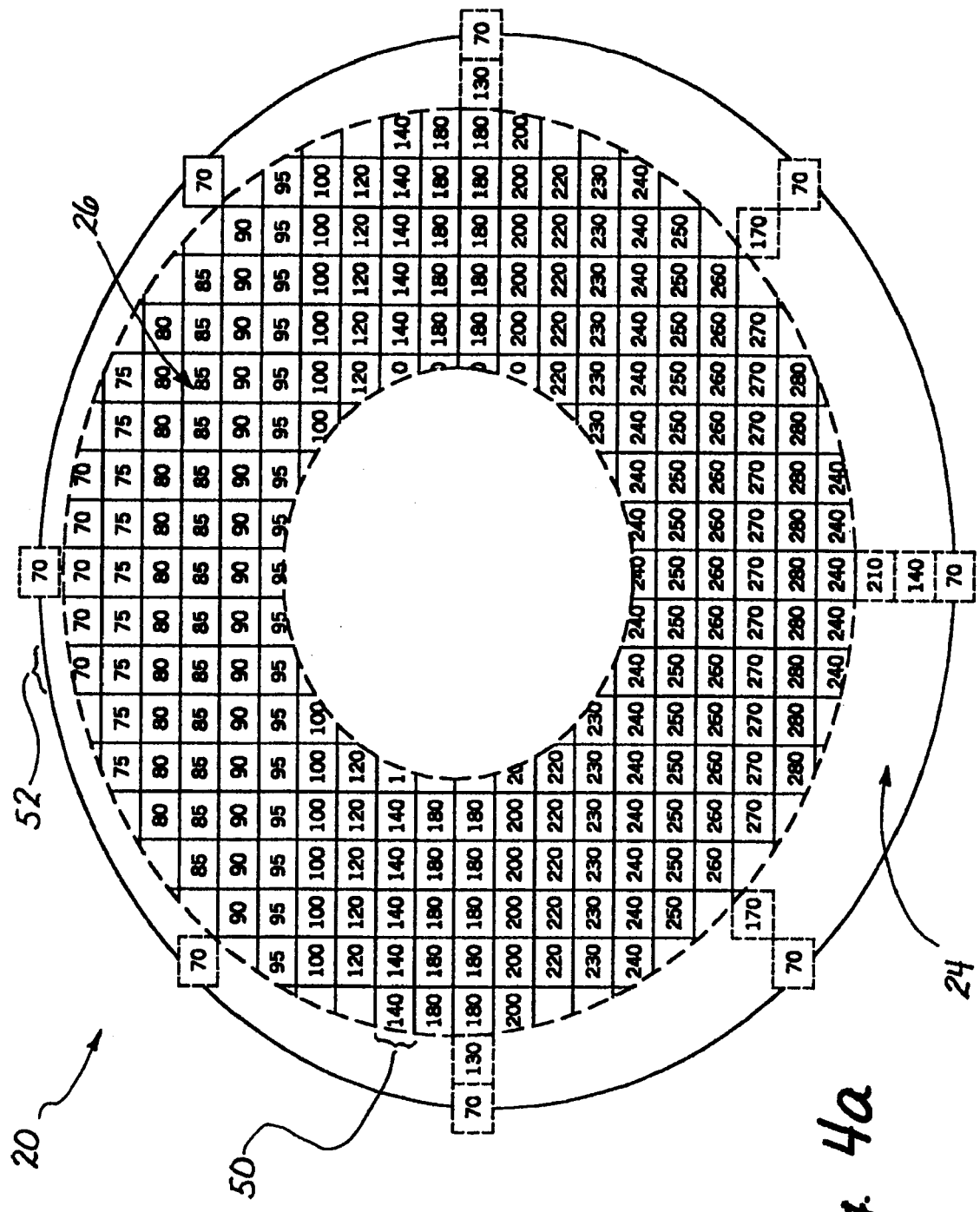
FIG. 4a is a schematic diagram of the contact lens of the present invention having an exemplary topographical numerical thickness map superimposed thereon.

Exemplary values for the thickness of the contact lens 20 having the distribution as seen in FIG. 3 are provided in the topographical depiction of FIG. 4a. It is understood that the contact lens 20 shown in FIG. 4a is generally circular. In FIG. 4a, the inner zone 26 is divided by horizontal and vertical grid lines into a plurality of discrete units. Each horizontal row of units has a uniform thickness throughout the inner zone 26. On the other hand, the thickness along a vertical column of units generally increases from the superior to the inferior. For example, horizontal row 50 has a uniform thickness of 140 μm other than in the optic zone. Vertical column 52 has a thickness of 70 μm at the top, gradually increases to 280 μmm, and begins to decrease just prior to the inferior portion of the peripheral zone 24. The values provided in FIG. 4a are exemplary and are suitable for a soft hydrogel contact lens. The values for lenses made of other materials may vary depending on the optical or other properties of the particular material.

It will be understood by the reader that the discrete units mapped in FIG. 4a represent the average thickness within each unit. That is, the thickness down the lens 20 changes gradually, rather than at a stepped border between units. More generally, although the present application describes distinct zones or portions in contact lenses, those zones are shown for clarity of description of the invention only. It will be appreciated by those skilled in the art that there are no sharp distinctions between these different zones of the lens, but that they are instead smoothly blended into one another.

FIG. 4a also illustrates the decreasing thickness or taper of the lens 20 through the peripheral zone 24. For example, at the inferior midpoint, the thickness decreases from 210-140-70 μm. This is also seen in the graph of FIG. 3. This taper within the peripheral zone 24 provides a so-called comfort zone around the edge of the lens 20. Because of the reduced thickness, movement of the eyelids across the contact lens is facilitated, and there is less irritation. Specifically, the eyelids more easily travel over the tapered peripheral zone 24 than if there were a more abrupt thickness change.

In an exemplary embodiment, the lens 20 has a corneal fitting relationship to maintain the lens centered on the cornea. The preferred lens has a diameter sufficient to achieve corneal coverage, and optimum stability is provided so that the lens does not become loose and unstable with gaze and blinking, which may influence the comfort and vision of the wearer. The sagittal depth (concave depth of the posterior face) for an optimum lens-cornea fitting relationship is between about 3.0 and 5.0 mm over a lens diameter of between about 13.0 mm and 16.0 mm. The lens diameter is more preferably between about 13.5-14.8 mm. A preferred thickness of the lens edge 36 is less than about 120 μm, more preferably about 90 μm. In this respect, the thickness is measured radially with respect to the curvature of the anterior face. The extreme outermost extent of the edge 36 may incorporate a preferred rounding of the anterior edge corner.

A plurality of meridian lines may be defined through the center of the lens. In a preferred embodiment, for maximum wearer comfort, the rate of change in lens radial thickness from the end of the ballast zone 34 to the lens edge 36 (i.e., in the peripheral zone 24) is less than about 250 μm/mm along any meridian of the lens. For example, in the topographical map of FIG. 4a, the rate of change of thickness along any meridian and within the peripheral zone 24 is less than about 250 μm/mm. More preferably, the rate of change in the peripheral zone 24 is less than about 200 μm/mm.

Figure 7:
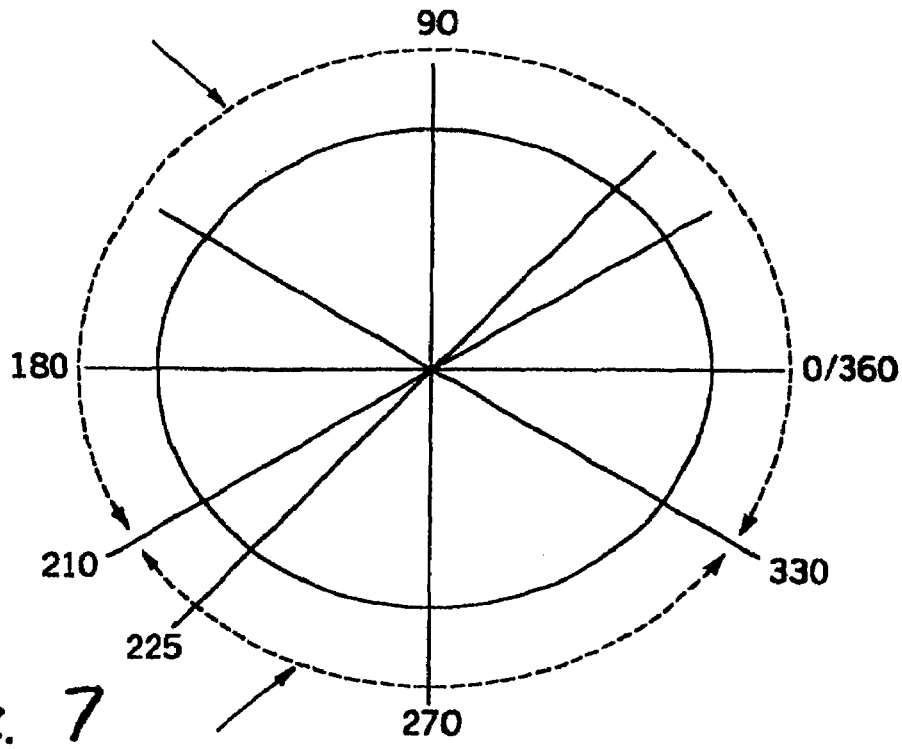
FIG. 7 is a schematic front elevational view of a contact lens having a number of meridian lines superimposed thereon for reference.

The advantageous interaction between the peripheral zone 24 and the iso-thickness is further exemplified in the proximity to the lens edge 36 of the point of maximum thickness, as variously measured around the lens. To illustrate this principle, FIG. 7 shows various meridians through the optical axis and around the lens in degrees, starting at the 3:00 o'clock position and moving counterclockwise. Of course, with iso-thickness in the inner zone 26, the point of maximum thickness along any horizontal meridian corresponds to the thickness along the entire horizontal meridian excluding the optical zone. Therefore, the beginning of the inner zone 26 and the point of maximum thickness along any meridian always lies on the ballast periphery 34. However, because of the preferred ballasting, the maximum thickness changes around the ballast periphery 34.

For prism ballasted lenses in accordance with the present invention, and along the 225° meridian, the distance between the point of maximum thickness (e.g., the ballast periphery 34) and the lens edge 36 is no greater than about 1.4 mm, regardless of the thickness. For any type of ballasted lens, the maximum thickness along the 225° meridian in accordance with the present invention is between about 200-400 μm, preferably between about 250-350 μm, and more preferably about 320 μm. Along the 270° meridian, the distance between the point of maximum thickness (e.g., the ballast periphery 34) and the lens edge 36 is no greater than about 1.8 mm, also regardless of the thickness, though a thickness of about 320 μm is preferred. For fully molded prism ballasted lenses (i.e., molded on both the anterior and posterior faces), and along a 225° meridian, the distance between the point of maximum thickness (e.g., the ballast periphery 34) and the peripheral edge is less than about 1.8 mm, and desirably, along a 270° meridian, the distance between the point of maximum thickness and the peripheral edge is less than about 2.1 mm. Also, along a 180° meridian, the distance between the inner zone and the peripheral edge is less than about 1.3 mm. In general, the peripheral zone 24 of the lenses of the present invention is relatively narrow in comparison to the prior art ballasted lenses, yet because of the preferred thicknesses the comfort taper angle in the peripheral zone 24 is relatively shallow, as mentioned above.

Although the preferred lens of the present invention has smooth, rounded transitions between different portions thereon, discrete boundaries or corners are not excluded. For example, the transition between the peripheral zone 24 and the inner zone 26 may be defined by a rounded corner or discontinuity at the circular ballast periphery 34. An example of the transition between the ballast area 26 and the peripheral zone 24 (i.e., at 34) along the meridian Z-Z' is seen in FIG. 3.

Figure 5A:
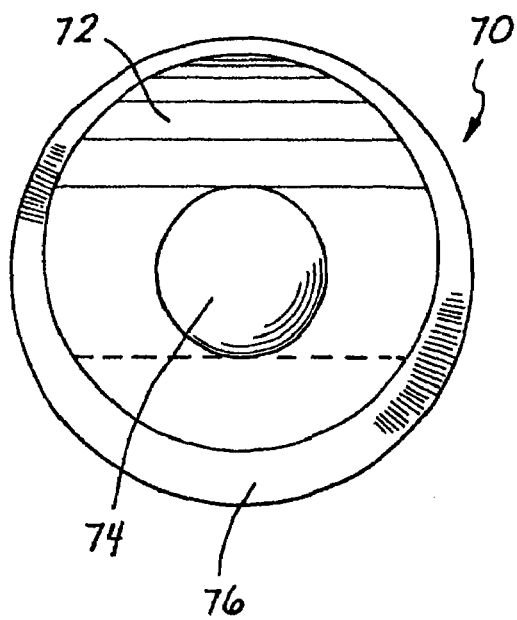
FIGS. 5a-5d are elevational views of contact lenses of the present invention each having a spherical anterior optical zone and varying regions of substantially uniform horizontal thickness.
Figure 5B:
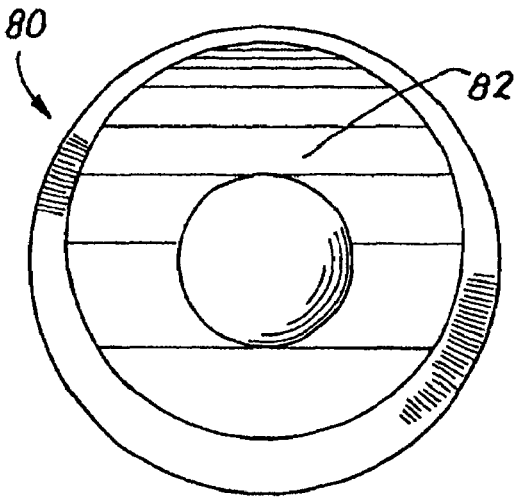
Figure 5C:
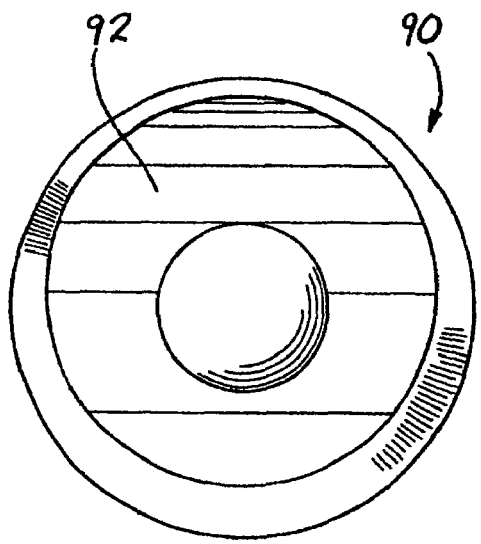
Figure 5D:
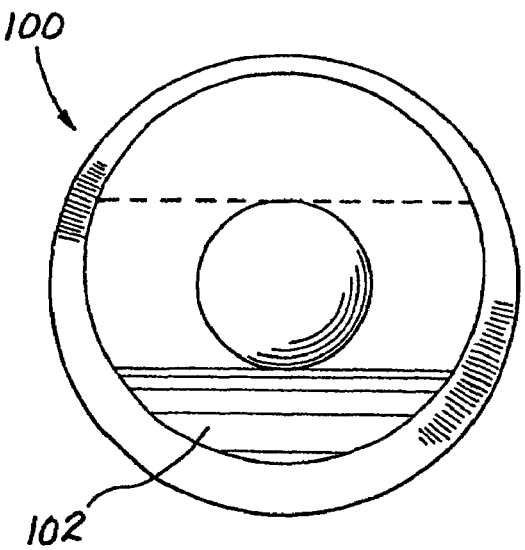

FIGS. 5a-5d illustrate several variations of the contact lens of the present invention having different ballast portions defined within the ballast zone. For purpose of explanation, the reader will refer back to FIG. 1 for the definition of the various portions (i.e., superior, intermediate, and inferior) of the inner zone 26. FIG. 5a shows a contact lens 70 having a ballast portion 72 defined within the superior portion of the inner zone. Again, the inner zone lies between an optic zone 74 and a peripheral zone 76. FIG. 5b illustrates a contact lens 80 of the present invention having a ballast portion 82 defined within both the superior and intermediate portions of the inner zone. FIG. 5c shows a contact lens 90 having a ballast portion 92 defined within the entire inner zone, through the superior, intermediate, and inferior portions thereof. Finally, FIG. 5d illustrate a contact lens 100 having a ballast portion 102 defined only within the inferior portion of the inner zone.

Other variations not shown include a ballast portion defined wholly within either the intermediate or inferior portions of the inner zone, or within the intermediate and inferior portions combined, exclusive of the superior portion. Also, the ballast portion could surround the optic zone in a so-called "periballast" arrangement, or could continue through the optic zone in a so-called "prism ballast" arrangement.

FIGS. 6a-6d illustrate a number of other contact lenses of the present invention having a cylindrical correction on the anterior face thereof. More specifically, a toric optic zone 110 is shown in each of the lenses oriented along a major axis 112 that is rotated with respect to the superior-inferior axis of the lens. The need for proper ballasting for the lenses is thus apparent to maintain the proper offset orientation of the axis 112.

Figure 6A:
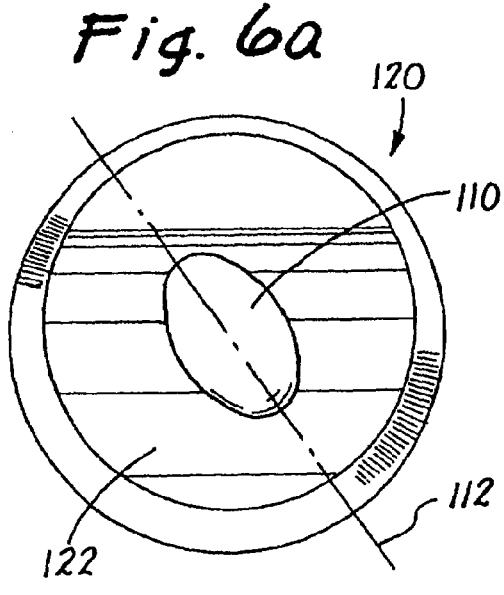
FIGS. 6a-6d are elevational views of contact lenses of the present invention each having a toric anterior optical zone and varying regions of substantially uniform horizontal thickness.
Figure 6B:
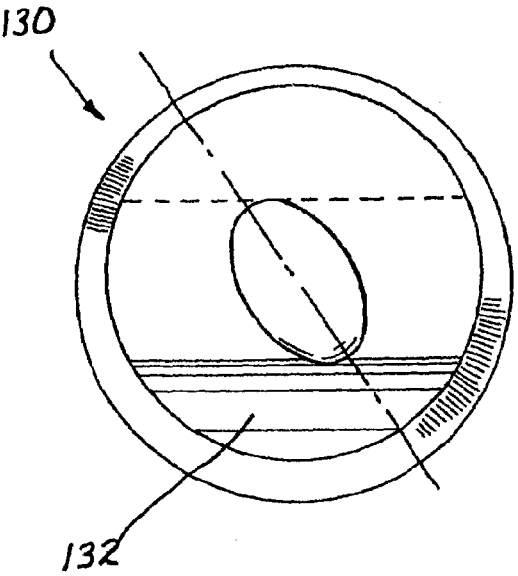
Figure 6C:
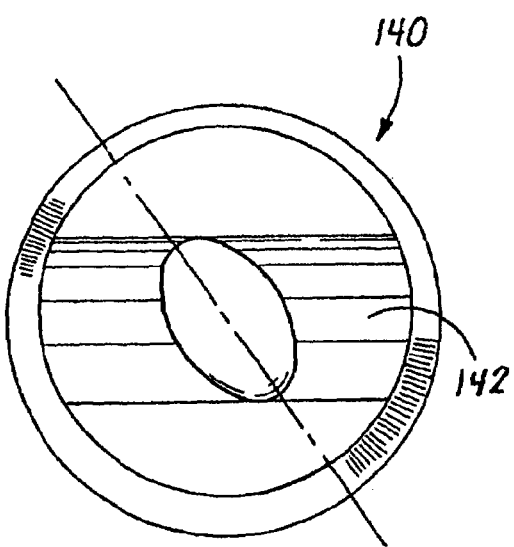
Figure 6D:
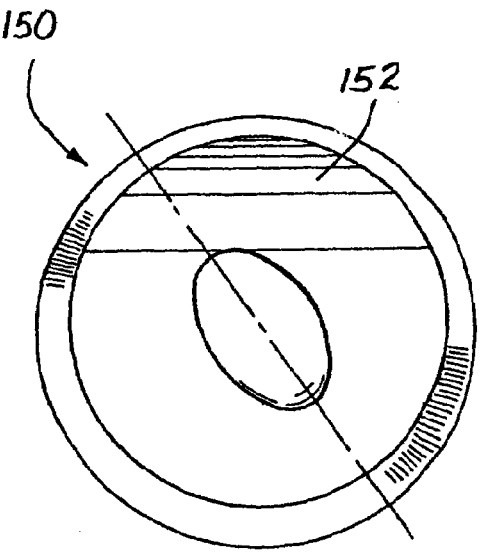

FIG. 6a shows a contact lens 120 having a ballast portion 122 beginning in the superior portion and continuing through both the intermediate and inferior portions of the inner zone. FIG. 6b shows a contact lens 130 having a ballast portion 132 located entirely within the inferior portion of the inner zone. FIG. 6c depicts a contact lens 140 having a ballast portion 142 wholly within the intermediate portion of the inner zone. Finally, FIG. 6d shows a lens 150 having a ballast portion 152 only within the superior portion of the inner zone.

Figure 8:
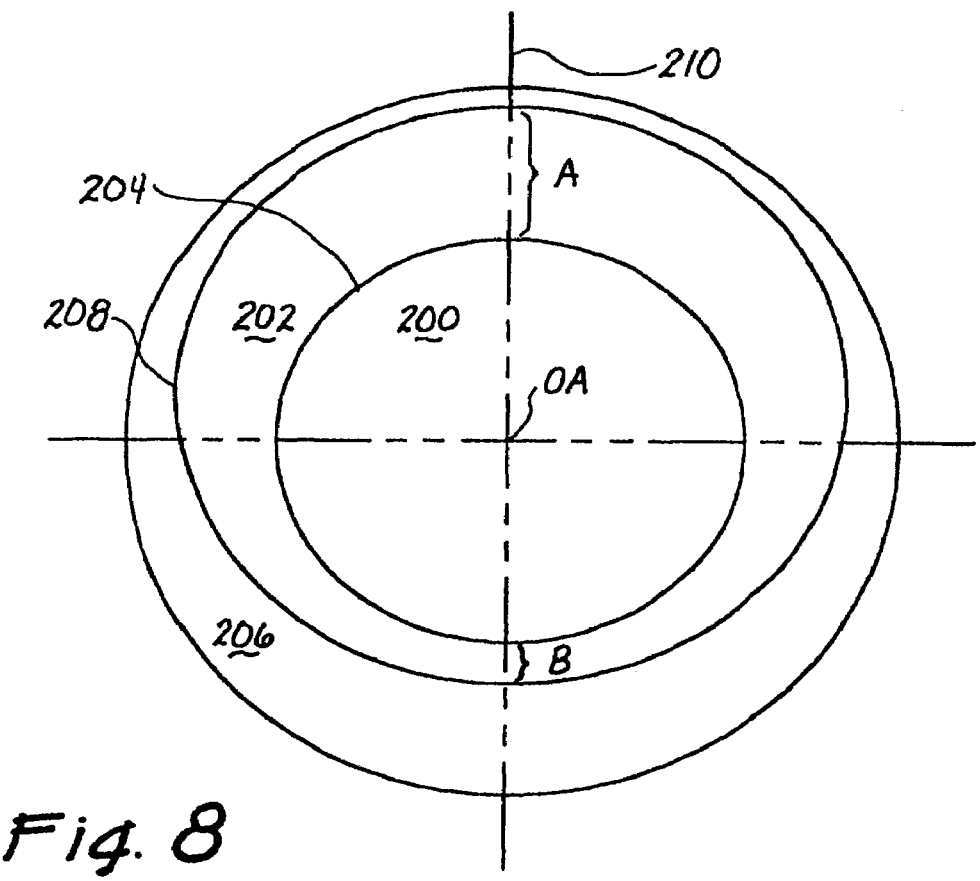
FIG. 8 is a schematic front elevational view of a contact lens of the prior art illustrating various zones defined thereon.

FIG. 8 shows a prism ballast lens of the prior art (Cooper-Vision Frequency Xcel (Encore) Toric) with lines demarking the transitions between various zones drawn. Specifically, an optic zone 200 is separated from a ballast zone 202 by a generally circular inner line 204, and the ballast zone is separated from a peripheral zone 206 by a generally circular outer line 208. While the inner line 204 is approximately centered as expected on the optical axis OA, the outer line 208 is offset upward along the vertical meridian 210. As a result, the ballast zone 202 is wider in the superior region than the inferior. Specifically, the superior radial width A of the ballast zone 202 is significantly greater than the inferior radial width B. Indeed, the superior radial width A is more than twice the inferior radial width B.

In contrast, as seen in FIG. 1, the lenses of the present invention have an inner zone 26 that is substantially annular, with a radial dimension A that is within about 300% of the radial width B. That is, for molded prism ballasted lenses the band is annular and the relationship $0.33A \leq B \leq A$ holds. Alternatively, for all prism ballasted lenses the annular band is within the range of $0.55A \leq B \leq A$.

The present invention provides the ease of cast molding with the ability to produce substantially smooth, rounded edge forms or surfaces without the need for costly post-processing steps.

Two mold halves, which are sometimes hereinafter referred to as "casting cups", are assembled together during conventional cast molding techniques. Lens material, for example a curable, mixture of polymerizable monomers, is introduced into a lens-shaped cavity defined between the casting cups to form the fully cast molded lens product.

Any suitable lens material or lens material precursor may be employed in forming the present contact lenses and lens bodies in accordance with the present invention, as described herein. Preferably, the contact lens or lens body, for example, hydrated for use, is soft and in the form of a hydrogel and/or a high oxygen permeability, that is a high Dk, material. One particularly useful class of lens materials are hydrophilic silicone-containing materials. Such hydrophilic silicone-containing materials are high Dk materials and may have a number of the advantageous properties of both silicone polymeric materials, for example, crosslinked silicone polymeric materials, and hydrogel-forming polymeric materials. Contact lenses made of hydrophilic silicone-containing materials often have a relatively high modulus and are very advantageous, for example, provide reduced risk of eye irritation, when structured to include a rounded peripheral edge form or surface, in accordance with the present invention.

One casting cup generally defines a negative impression of the lens back or posterior surface (base curve) and one casting cup generally defines a negative impression of the lens front or anterior surface.

In commercially available lenses, the point at which the two mold halves meet is usually chosen as the outer periphery of the finished lens. This point generally defines the molded lens edge. The edge of a fully molded lens conventionally represents the split line between the male and female casting cups.

Figure 9:
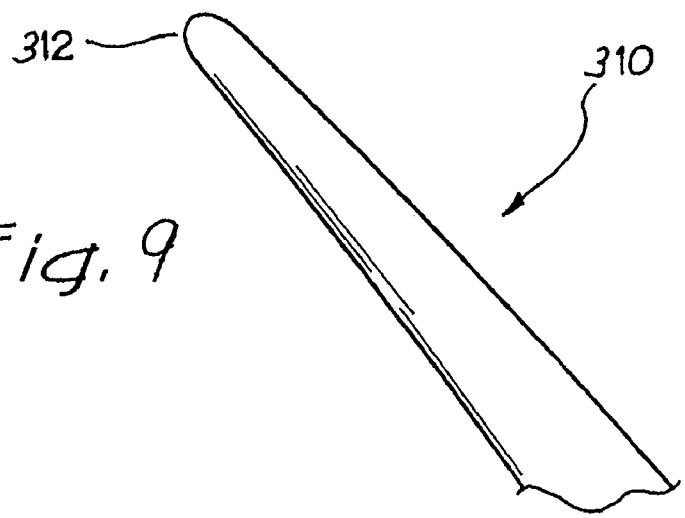
FIG. 9 is a cross sectional view of a fully cast molded contact lens manufactured using a method of the present invention, the contact lens having a substantially smooth, rounded edge profile.

A contact lens 310 formed by a method in accordance with the present invention is shown in FIG. 9.

Importantly, the illustrated lens 310 is produced in the fully molded state, without post molding steps designed to alter the shape or configuration of the peripheral edge. As shown, the lens 310 produced by a method in accordance with the present invention has a rounded, smooth edge 312.

Although the lens 310 may have seen some of the processing steps conventionally associated with a lens of this type, for example, demolding, hydration, inspection, packaging and sterilization, the lens 310 edge profile has not been substantially altered from its original, molded shape.

The illustrated lens 310 is produced by modification to insert tooling which is conventionally used to create the casting cups (i.e. mold halves) that are used to cast mold the lens.

As is well known in the art, prior to the cast molding of the contact lens, each of the mold sections (such as the back surface mold and the front surface mold), is formed by injection molding a resin in the cavity of an injection molding apparatus. Mounted in the injection molding apparatus are "tools" (hereinafter sometimes referred to as "tooling inserts") for forming the optical surface impressions on the mold sections. Whereas the mold sections are typically used only once for casting an individual lens, the injection molding tools are used to make hundreds of mold sections (i.e. mold halves).

The tools used to make the mold sections are manufactured to extremely high specifications. No roughness or other surface defects are acceptable on a tool as such defects would be transferred to all of the mold sections made therefrom. Any such defect on the mold section surface would be transferred to the molded contact lens. The tools are typically made from brass, stainless steel, nickel or some combination thereof.

Figure 10A:
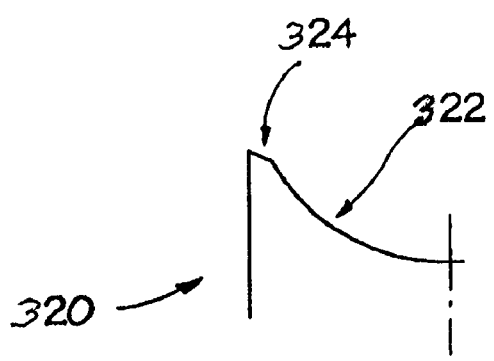
FIGS. 10A and 10B are sectional and front views of a conventional tooling insert used in conventional contact lens manufacturing techniques to form a mold section used for cast molding a contact lens.
Figure 10B:
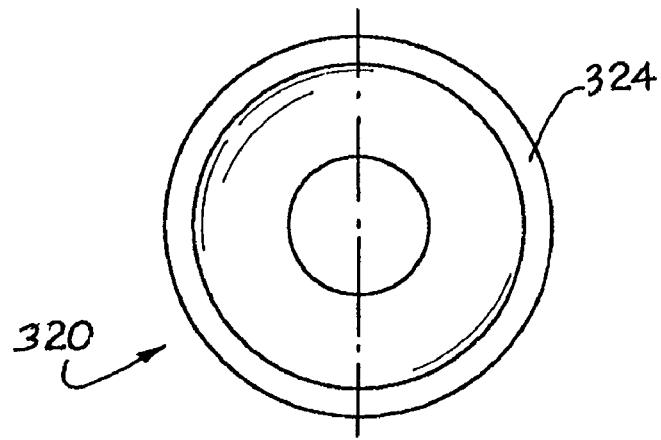

Turning now to FIGS. 10A and 10B, a conventionally manufactured tool 320 is shown.

Typically, for making the back surface mold, the tool 320 includes at least one base curve (represented by line 322), to provide fit and/or refractive correction, the correction being, for example, spherical, toroidal, multifocal, bifocal, etc. In addition, the tool 320 includes a feature 324 which forms part of the lens edge geometry. Feature 324 is sometimes tapered. The edge tapering on the back surface tool is conventionally flat or concave, in order to achieve a taper on the edge of the molded lens.

In other conventional tools (not shown) the edge feature 324 is omitted from the tool and the base curve is run out to the lens periphery. For example, the back surface tool may have no defined edge feature other than the base curve itself. In this case, edge tapering of the molded lens is usually accomplished by the surface profile of the front surface mold tool which includes a tapered edge feature.

As is described elsewhere herein, a method for cast molding a contact lens in accordance with the present invention generally comprises the steps of providing a back surface tool having a surface corresponding to a desired contact lens surface and at least one convex curve along an outer radius thereof, positioning the tool in a molding apparatus, for example, a conventional injection molding apparatus, introducing a moldable material into the molding apparatus and subjecting the material to conditions, for example, chosen from conditions conventionally used, effective to form a first mold section having a negative impression of the surface of the tool, assembling the first mold section with a second mold section to form a lens shaped cavity therebetween, and forming a contact lens member having a rounded edge form in the lens shaped cavity of the assembled mold sections. Upon demolding, the contact lens member itself is the contact lens product, or can be subjected to hydration to provide the contact lens product.

Figure 12:
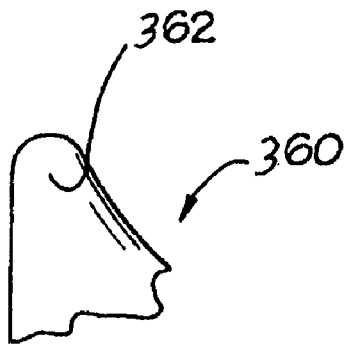
FIG. 12. is a cross sectional view of the insert of the present invention, taken along line 12-12 of FIG. 11.
Figure 11:
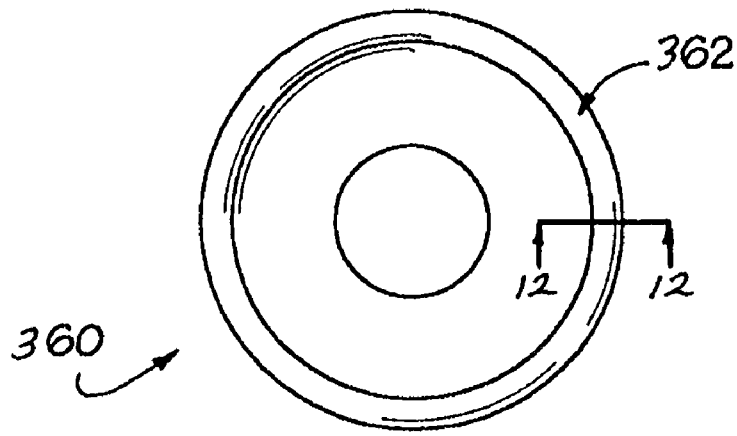
FIG. 11 is a front view of a tooling insert used in a method of the present invention to form a mold section used for cast molding a contact lens with a substantially smooth, rounded edge.
Figure 13:
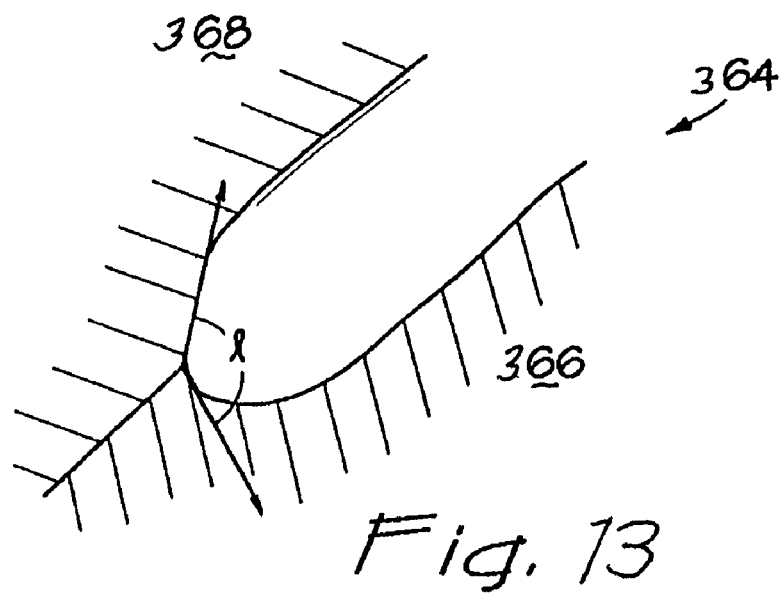
FIG. 13 is a cross sectional view of molding apparatus for forming a rounded edge contact lens in accordance with a method of the present invention.

More particularly, referring now to FIGS. 11-13, in contrast to the conventionally cast molded lenses, the present invention purposefully places at least one convex radius, or curve, at the outer or peripheral edge of a back surface tooling insert. This convex radius can be generated by a series of flats, for example, very short flats which together closely simulate continuously curved convex shaping, or by a combination of flats and convex curves, on the tooling insert.

Referring now specifically to FIGS. 11 and 12, in one embodiment of the present invention, a tooling insert 360 is provided. The tooling insert 360 having such convex shaping as generally described hereinabove. For the lens 310 manufactured in accordance with the present invention and shown in FIG. 9, the tool 360 used in the manufacture of the lens 310 includes a convex curve along its outer radius, or peripheral edge surface 362.

Unlike prior tooling inserts that have been used in the manufacture of conventionally cast molded lenses, the present invention provides a method for manufacturing a contact lens having a cast molded, convex curved radius at the lens edge periphery.

Referring now as well to FIG. 13, a portion of an assembled casting cup pair 364 for fully cast molding a rounded edge contact lens in accordance with the present invention is shown. The cup pair 364 comprises a first, back surface mold half 366 assembled with a second, front surface mold half 368. The convex outer radius of the tool 360 used to make the back surface mold half 366 may be about 0.05 mm radius or larger.

When the mold halves 366, 368 are assembled together, the final fully cast molded lens, such as lens 310, has a substantially smooth, rounded edge as shown. Using a convex curve on the portion of the back surface tool 360 that creates the lens periphery can be used to yield a lens with a much more rounded shape, such as seen in the lens 310 of FIG. 9.

Preferably, when the two mold halves 366, 368 are assembled, the angle of intersection (represented by symbol α in FIG. 13) of the molds 366, 368, on the lens side, is greater than about 100 degrees. In the case of the lens 310 shown in FIG. 9 the angle of intersection of the two mold halves, on the lens side, is 140 degrees on the unprocessed or unhydrated lens member, in the dry state, producing a final or hydrated contact lens 310 with a much more rounded or less clearly defined edge surface. It is to be appreciated that the angle of intersection of the two mold halves on the lens side could be made less than or greater than about 140 degrees, for example, angles greater than 100 degrees could be used, for example, in the range of about 100 degrees to about 170 degrees or more.

After assembling the mold halves 366, 368, the rounded edged contact lens can be cast molded using conventional steps as known to those skilled in the art and described hereinabove. Although it is appreciated that processing steps performed after the cast molding, for example hydration, in the case of a hydrogel hydrophilic lenses, may to some extent change the finished lens manufactured in accordance with the present invention, the peripheral edge form of the finished lens remains substantially unaltered and much smoother than the conventional 'chiseled' edge previously seen.

By implementation of the present invention, a fully cast molded lens can be created with the desired (rounded) edge, without the need for dedicated post formation polishing and machining steps to create the desired peripheral edge form.

It will be appreciated that the present invention may be embodied in lenses having varying optical powers. For example, a contact lens of the present invention may have an optic power of between about −8 to about +8 diopters, although this range is not to be considered limiting.

Additionally, the contact lenses according to the present invention may also comprise stabilization features other than the uniform thickness ballast arrangement. For example, the peripheral zone may include a flattened region for dynamic stabilization, or the lens may incorporate a periballast stabilization outside of the central optic.

While this invention has been described with respect to various specific examples and embodiments, it is to be understood that the invention is not limited thereto and that it can be variously practiced within the scope of the following claims.

What is claimed is:

1. A contact lens, comprising:
a rotationally stabilized silicone-hydrogel contact lens body having an anterior face, a posterior face, and a rounded peripheral edge posterior portion, the body having a thickness between the anterior face and the posterior face, a superior edge and an opposing inferior edge, and a vertical meridian defined from the superior edge toward the inferior edge and a horizontal meridian perpendicular thereto; and
the lens body comprising a centrally located optic zone surrounding an optical axis of the lens body, and an optic circumscribing zone comprising a superior portion between a superior extent of the optic zone and a superior extent of the optic circumscribing zone, an inferior portion between an inferior extent of the optic zone and an inferior extent of the optic circumscribing zone, and at least one region in the superior portion or the inferior portion having a substantially uniform horizontal thickness.

2. The contact lens of claim 1, wherein the lens body includes a ballast.

3. The contact lens of claim 2, wherein the ballast is selected from the group consisting of prism ballasts and periballasts.

4. The contact lens of claim 1, wherein the lens body includes a midsection having a greater thickness relative to a superior section and an inferior section of the lens body.

5. The contact lens of claim 1, wherein the lens body has an increasing thickness from the superior edge of the lens body toward the optic zone along a line parallel to the vertical meridian.

6. The contact lens of claim 1, wherein the lens body has a maximum thickness at a region located between the optic zone and the inferior edge of the lens body.

7. The contact lens of claim 1,
wherein the optic circumscribing zone further comprises an intermediate portion located between the superior portion and the inferior portion, and includes a ballast portion defined within one or more of the superior, intermediate, and inferior portions and has a series of consecutive horizontal cross-sections exclusive of the optic zone spanning a distance along the vertical meridian of at least 20% of the smallest dimension of the superior, intermediate, and inferior portions as measured along the vertical meridian, wherein each horizontal cross-section has a substantially uniform thickness not varying by more than about 30 μm or 20%, whichever is greater in absolute terms.

8. The contact lens of claim 7, wherein the ballast portion is defined wholly within only one of the superior, intermediate, and inferior portions.

9. The contact lens of claim 7, wherein the ballast portion is defined wholly within only two of the superior, intermediate, and inferior portions.

10. The contact lens of claim 7, wherein the ballast portion is defined within all three of the superior, intermediate, and inferior portions.

11. The contact lens of claim 1, further including a cylindrical correction on either the anterior face or the posterior face.

12. The contact lens of claim 11, wherein the cylindrical correction is provided on the posterior face, and wherein the optic zone of the anterior face comprises a spherical correction.

13. The contact lens of claim 1, wherein the optic circumscribing zone is of substantially uniform radial width around the circumference of the lens.

14. The contact lens of claim 1, wherein the lens further incorporates a negative spherical power distance correction.

15. The contact lens of claim 1, wherein the optic circumscribing zone comprises a plurality of regions represented by imaginary horizontal bands extending from an outer edge of the optic circumscribing zone towards the vertical meridian of the lens body, each band having a constant thickness across the lens body.

16. The contact lens of claim 1, wherein the optic circumscribing zone comprises a plurality of regions represented by substantially horizontal bands extending from an outer edge of the optic circumscribing zone towards the vertical meridian of the lens body, each band having a substantially uniform thickness, and the thickness of the optic circumscribing zone varies vertically less than about 400% of the minimum thickness of the optic circumscribing zone.

17. The contact lens of claim 1, wherein the thickness of the lens body varies from a superior-most portion of the optic circumscribing zone to an inferior-most portion of the optic circumscribing zone by no greater than about 210 micrometers.

18. The contact lens of claim 1, wherein the optic circumscribing zone has a vertical lens thickness profile parallel to the vertical meridian, the vertical lens thickness profile having a thickness that varies by less than about 400% of the minimum thickness of the optic circumscribing zone.

19. The contact lens of claim 1, wherein the optic circumscribing zone comprises a first region extending from the optic zone on one side of the vertical meridian, and a second region extending from the optic zone on the opposite side of the vertical meridian.

20. The contact lens of claim 1, wherein the at least one region is located superior to the optic zone.

21. The contact lens of claim 1, wherein, along a straight line representing a 225° meridian, the straight line distance between the optic circumscribing zone and the peripheral edge is less than 1.4 mm.

22. The contact lens of claim 1, wherein the at least one region is located inferior to the optic zone.

23. The contact lens of claim 1 which is cast molded and is subjected to no post-formation processing to alter the rounded configuration of the peripheral edge posterior portion.

24. The contact lens of claim 1, wherein the rounded peripheral edge posterior portion is substantially smooth.

25. A contact lens, comprising:
a rotationally stabilized silicone-hydrogel contact lens body having an anterior face, a posterior face, and a rounded posterior peripheral edge surface, the body having a thickness between the anterior face and the posterior face, a superior edge and an opposing inferior edge, and a vertical meridian defined from the superior edge toward the inferior edge and a horizontal meridian perpendicular thereto; and
the lens body comprising a centrally located optic zone surrounding an optical axis of the lens body, and an optic circumscribing zone comprising a superior portion between a superior extent of the optic zone and a superior extent of the optic circumscribing zone, an inferior portion between an inferior extent of the optic zone and an inferior extent of the optic circumscribing zone, the superior portion, the inferior portion, or both the superior and inferior portion having a series of consecutive horizontal cross-sections, each horizontal cross-section having a substantially uniform horizontal thickness,
wherein, along a straight line representing a 225° meridian, the straight line distance between the optic circumscribing zone and the peripheral edge is less than 1.4 mm.

26. The contact lens of claim 25, wherein the optic circumscribing zone has an inner border adjacent to an outer border of the optic zone.

27. The contact lens of claim 25, wherein the entire optic circumscribing zone has a series of consecutive horizontal cross-sections, exclusive of the optic zone, each horizontal cross-section having a substantially uniform thickness.

28. The contact lens of claim 25, wherein the optic circumscribing zone further comprises a ballast.

29. The contact lens of claim 28, wherein the ballast comprises a series of consecutive horizontal cross-sections, each horizontal cross-section having a substantially uniform thickness.

* * * * *

UNITED STATES PATENT AND TRADEMARK OFFICE
CERTIFICATE OF CORRECTION

PATENT NO.         : 7,628,485 B2
APPLICATION NO.    : 11/609852
DATED              : December 8, 2009
INVENTOR(S)        : Arthur Back et al.

It is certified that error appears in the above-identified patent and that said Letters Patent is hereby corrected as shown below:

Column 4

Line 43, "$0.33A \leqq B \leqq A$" should read --$0.33A \leq B \leq A$--.

Line 45, "$0.55A \leqq B \leqq A$" should read --$0.55A \leq B \leq A$--.

Column 11

Line 15, "120 μμm" should read --120 μm--.

Column 12

Line 8, "rounded comer" should read --rounded corner--.

Column 13

Line 3, "$0.33A \leqq B \leqq A$" should read --$0.33A \leq B \leq A$--.

Line 5, "$0.55A \leqq B \leqq A$" should read --$0.55A \leq B \leq A$--.

Signed and Sealed this

Sixteenth Day of March, 2010

David J. Kappos
*Director of the United States Patent and Trademark Office*

Disclaimer and Dedication

7,628,485 B2—Arthur Back, Danville, CA (US); Gregg A. Dean, Southampton (GB). CONTACT LENS HAVING A UNIFORM HORIZONTAL THICKNESS PROFILE. Patent dated December 8, 2009. Disclaimer filed January 12, 2012, by the assignee, Coopervision International Holding Company, LP.

Hereby disclaims and dedicates to the public, all claims 1-29 of said patent.

*(Official Gazette, February 14, 2012)*